(12) United States Patent
Gotou et al.

(10) Patent No.: US 10,519,318 B2
(45) Date of Patent: Dec. 31, 2019

(54) ACTINIC-RAY-CURABLE COATING COMPOSITION

(71) Applicant: KANSAI PAINT CO., LTD., Hyogo (JP)

(72) Inventors: Kouta Gotou, Kanagawa (JP); Haruhiko Okiyama, Kanagawa (JP); Haruka Nakaoka, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 0 days.

(21) Appl. No.: 15/770,351

(22) PCT Filed: Oct. 24, 2016

(86) PCT No.: PCT/JP2016/081463
§ 371 (c)(1),
(2) Date: Apr. 23, 2018

(87) PCT Pub. No.: WO2017/073522
PCT Pub. Date: May 4, 2017

(65) Prior Publication Data
US 2018/0312697 A1    Nov. 1, 2018

(30) Foreign Application Priority Data

Oct. 27, 2015  (JP) ................................. 2015-211289

(51) Int. Cl.
| | | |
|---|---|---|
| *C09D 7/48* | (2018.01) | |
| *C09D 4/00* | (2006.01) | |
| *C09D 7/40* | (2018.01) | |
| *C08F 2/48* | (2006.01) | |
| *C08F 22/14* | (2006.01) | |
| *C08F 22/22* | (2006.01) | |

(52) U.S. Cl.
CPC .................. *C09D 4/00* (2013.01); *C08F 2/48* (2013.01); *C09D 7/40* (2018.01); *C09D 7/48* (2018.01); *C08F 22/14* (2013.01); *C08F 22/22* (2013.01)

(58) Field of Classification Search
CPC .................................. B05D 3/067; C09D 7/48
See application file for complete search history.

(56) References Cited

U.S. PATENT DOCUMENTS

| | | | |
|---|---|---|---|
| 5,260,361 A | 11/1993 | Fukushima et al. | |
| 6,022,919 A * | 2/2000 | Komoto ............. | C08G 18/6254 523/200 |
| 6,844,029 B2 * | 1/2005 | Okada ................ | C08G 18/6254 427/407.1 |
| 2002/0099218 A1 * | 7/2002 | Sassi .................... | C07D 211/46 546/233 |
| 2003/0109595 A1 | 6/2003 | Okada et al. | |

FOREIGN PATENT DOCUMENTS

| | | |
|---|---|---|
| CN | 104448981 | 3/2015 |
| JP | 5-230397 | 9/1993 |
| JP | 11-140352 | 5/1999 |
| JP | 2002-293853 | 10/2002 |
| JP | 2002-363480 | 12/2002 |
| JP | 2011-20381 | 2/2011 |
| JP | 2012-252748 | 12/2012 |

OTHER PUBLICATIONS

International Search Report dated Nov. 29, 2016 in International (PCT) Application No. PCT/JP2016/081463.
Decision to Grant a Patent dated Feb. 14, 2017 in Japanese Application No. 2017-502286, with English translation.
Office Action dated Sep. 17, 2019 in corresponding Chinese Patent Application No. 201680060781.0, with English translation.

* cited by examiner

*Primary Examiner* — Dah-Wei D. Yuan
*Assistant Examiner* — Kristen A Dagenais-Englehart
(74) *Attorney, Agent, or Firm* — Wenderoth, Lind & Ponack, L.L.P.

(57) ABSTRACT

This invention provides the following active energy ray-curable coating composition: an active energy ray-curable coating composition comprising (A) a polymerizable unsaturated group(s)-containing acrylic resin having a weight average molecular weight in the range of 5,000 to 30,000, (B) a urethane (meth)acrylate having a weight average molecular weight in the range of 1,000 or more but less than 5,000 and containing an average of two to four polymerizable unsaturated groups per molecule, (C) a polymerizable unsaturated compound having a weight average molecular weight in the range of 200 or more but less than 1,000 and containing an average of two to nine polymerizable unsaturated groups per molecule, and (D) a photopolymerization initiator, the molecular weight between crosslinks of a cured coating film obtained by applying the active energy ray-curable coating composition being in the range of 300 to 900 g/mol.

8 Claims, No Drawings

ACTINIC-RAY-CURABLE COATING COMPOSITION

TECHNICAL FIELD

Cross-Reference to Related Applications

This application claims priority to Japan Patent Application No. 2015-211289, filed on Oct. 27, 2015, the disclosure of which is incorporated herein by reference in its entirety.

The present invention relates to an active energy ray-curable coating composition and a coated article comprising a coating film of the active energy ray-curable coating composition formed on it.

BACKGROUND ART

To impart excellent appearance, properties, etc. to the surface of a substrate, a coating film is conventionally formed on the surface of the substrate by applying a coating composition to the surface of the substrate to form a wet coating film and curing the wet coating film. As the coating composition, active energy ray-curable coating compositions, in which the curing of a wet coating film is carried out with active energy rays, have been studied from the viewpoint of, for example, saving energy and improving productivity.

Further, in recent years, application of such an active energy ray-curable coating composition to substrates with a relatively large area to be coated, such as home electric appliances and interior and exterior automobile parts, has been considered. However, in forming a coating film on a substrate with a relatively large area to be coated, foreign matter, including dirt and dust, may adhere to the wet coating film surface and be stuck on the cured coating film, resulting in defects in the coating film.

Such defects in the coating film are commonly repaired by removing the foreign matter causing the defects, by sanding the cured coating film, and subsequently erasing the traces left by sanding, with polishing powder. Thus, there is recently demand for an active energy ray-curable coating composition capable of forming a coating film with excellent appearance and such excellent repairability that the foreign matter on the coating film can be removed while maintaining the excellent appearance.

Patent Literature 1 discloses that a coating composition containing a (meth)acryloyl group-containing polypentaerythritol, a urethane poly(meth)acrylate compound having radical-polymerizable unsaturated double bonds, a (meth)acryloyl group-containing (iso)cyanurate, an ultraviolet absorber, and a photopolymerization initiator in specific amounts is capable of forming, on the surface of a substrate, a crosslinked cured film with excellent abrasion resistance, surface smoothness, thermal resistance, chemical resistance, durability, weather resistance, and adhesion to the substrate by active-energy-ray irradiation. However, a coating film formed from the coating composition is problematic in that the repairability is insufficient.

CITATION LIST

Patent Literature

PTL 1: JPH05-230397A

SUMMARY OF INVENTION

Technical Problem

The present invention has been accomplished in view of the circumstances described above, and an object of the present invention is to provide an active energy ray-curable coating composition capable of forming a coating film with excellent coating film appearance and repairability.

Solution to Problem

The present inventors conducted extensive research to achieve the above object, and found that the object can be achieved by an active energy ray-curable coating composition that comprises a specific polymerizable unsaturated group(s)-containing acrylic resin, a specific urethane (meth)acrylate, a specific polymerizable unsaturated compound, and a photopolymerization initiator and that forms a cured coating film having a specific molecular weight between crosslinks.

Specifically, the present invention includes the following embodiments.

Item 1. An active energy ray-curable coating composition comprising:

(A) a polymerizable unsaturated group(s)-containing acrylic resin having a weight average molecular weight in the range of 5,000 to 30,000;

(B) a urethane (meth)acrylate having a weight average molecular weight in the range of 1,000 or more but less than 5,000 and containing an average of two to four polymerizable unsaturated groups per molecule;

(C) a polymerizable unsaturated compound having a weight average molecular weight in the range of 200 or more but less than 1,000 and containing an average of two to nine polymerizable unsaturated groups per molecule; and (D) a photopolymerization initiator, the molecular weight between crosslinks of a cured coating film obtained by applying the active energy ray-curable coating composition being in the range of 300 to 900 g/mol.

Item 2. The active energy ray-curable coating composition according to Item 1, wherein the amount of the component (A) on a solids basis is in the range of 20 to 70 mass %, the amount of the component (B) on a solids basis is in the range of 10 to 60 mass %, and the amount of the component (C) on a solids basis is in the range of 1 to 30 mass %, based on the total solids content of the components (A), (B), and (C).

Item 3. The active energy ray-curable coating composition according to Item 1 or 2, which further comprises an ultraviolet absorber and/or a light stabilizer.

Item 4. The active energy ray-curable coating composition according to any one of Items 1 to 3, wherein the cured coating film has a glass transition temperature in the range of 20 to 80° C.

Item 5. A cured coating film obtained by curing the active energy ray-curable coating composition according to any one of Items 1 to 4, the cured coating film having a molecular weight between crosslinks in the range of 300 to 900 g/mol.

Item 6. A coated article comprising a cured coating film of the active energy ray-curable coating composition according to any one of Items 1 to 4 on a substrate.

Item 7. A method for forming a coating film, comprising: applying the active energy ray-curable coating composition according to any one of Items 1 to 4 to a substrate to form an uncured coating film; and irradiating the uncured coating film with active energy rays to cure the coating film.

The present invention also includes the following embodiment.

A method for preparing an active energy ray-curable coating composition, comprising:

mixing, and dissolving or dispersing, (A) a polymerizable unsaturated group(s)-containing acrylic resin having a weight average molecular weight in the range of 5,000 to 30,000, (B) a urethane (meth)acrylate having a weight average molecular weight in the range of 1,000 or more but less than 5,000 and containing an average of two to four polymerizable unsaturated groups per molecule, (C) a polymerizable unsaturated compound having a weight average molecular weight in the range of 200 or more but less than 1,000 and containing an average of two to nine polymerizable unsaturated groups per molecule, and (D) a photopolymerization initiator in a solvent, the components (A), (B), (C), and (D) being dissolved or dispersed so that the molecular weight between crosslinks of a cured coating film obtained by applying an active energy ray-curable coating composition to be prepared is in the range of 300 to 900 g/mol.

Advantageous Effects of Invention

Since the active energy ray-curable coating composition of the present invention has the above features, the coating composition is capable of forming a coating film with excellent coating film appearance and repairability.

DESCRIPTION OF EMBODIMENTS

The active energy ray-curable coating composition of the present invention is described in further detail below.

The active energy ray-curable coating composition of the present invention comprises (A) a polymerizable unsaturated group(s)-containing acrylic resin having a weight average molecular weight in the range of 5,000 to 30,000, (B) a urethane (meth)acrylate having a weight average molecular weight in the range of 1,000 or more but less than 5,000 and containing an average of 2 to 4 polymerizable unsaturated groups per molecule, (C) a polymerizable unsaturated compound having a weight average molecular weight in the range of 200 or more but less than 1,000 and containing an average of 2 to 9 polymerizable unsaturated groups per molecule, and (D) a photopolymerization initiator, and a cured coating film obtained by applying the active energy ray-curable coating composition has a molecular weight between crosslinks in the range of 300 to 900 g/mol.

Polymerizable Unsaturated Group(s)-Containing Acrylic Resin (A)

The polymerizable unsaturated group(s)-containing acrylic resin (A) is a resin containing at least one polymerizable unsaturated group per molecule and having a weight average molecular weight in the range of 5,000 to 30,000.

A "polymerizable unsaturated group" is an unsaturated group that can undergo radical polymerization. Specific examples include acryloyl groups, methacryloyl groups, vinyl groups, allyl groups, propenyl groups, isopropenyl groups, maleimide groups, vinyl ether groups, and the like.

Of these polymerizable unsaturated groups, acryloyl groups and methacryloyl groups are preferable, and acryloyl groups are particularly preferable, in view of excellent reactivity.

From the viewpoint of coating film appearance, repairability of the resulting coating film (which hereinafter may be simply referred to as "repairability"), etc., it is particularly preferred that the weight average molecular weight of the polymerizable unsaturated group(s)-containing acrylic resin (A) is in the range of 6,000 to 20,000, and preferably 7,000 to 12,000.

In this specification, the number average molecular weight and the weight average molecular weight are determined by converting the retention time (retention volume) measured by gel permeation chromatography (GPC) into polystyrene molecular weight, based on the retention time (retention volume) of a standard polystyrene having a known molecular weight measured under the same conditions. More specifically, the number average molecular weight and the weight average molecular weight can be measured using a gel permeation chromatography device (HLC-8120GPC (trade name) produced by Tosoh Corporation) together with four columns (TSKgel G4000HXL, TSKgel G3000HXL, TSKgel G2500HXL, and TSKgel G2000HXL (trade names) all produced by Tosoh Corporation) and a differential refractometer as a detector under the following conditions: mobile phase: tetrahydrofuran; measurement temperature: 40° C.; and flow rate: 1 mL/min.

From the viewpoint of coating film appearance, repairability, etc., it is preferred that the polymerizable unsaturated group(s)-containing acrylic resin (A) has an unsaturated equivalent in the range of 350 to 4,000 g/mol, preferably 450 to 2,500 g/mol, and more preferably 500 to 1,500 g/mol.

In this specification, the unsaturated equivalent refers to the mass of a compound per mol of polymerizable unsaturated group(s). The unsaturated equivalent is a value obtained by dividing the mass of a compound by the amount of polymerizable unsaturated group(s) present in the compound (g/mol). In this specification, the unsaturated equivalent is a theoretical value calculated from the mass of starting material(s) used in the synthesis of a compound.

Moreover, from the viewpoint of repairability etc., it is preferred that the polymerizable unsaturated group(s)-containing acrylic resin (A) has 2 to 20, preferably 5 to 16, polymerizable unsaturated groups per molecule.

The polymerizable unsaturated group(s)-containing acrylic resin (A) can be produced by, for example, reacting a functional group(s)-containing acrylic resin with a radically polymerizable unsaturated compound containing a reactive group that is reactive with the functional group, and a polymerizable unsaturated group.

Specifically, the polymerizable unsaturated group(s)-containing acrylic resin (A) is obtained by, for example, 1) a method in which an addition reaction of an epoxy-containing acrylic resin with a carboxy-containing polymerizable unsaturated compound is conducted, 2) a method in which an addition reaction of a carboxy-containing acrylic resin with an epoxy-containing polymerizable unsaturated compound is conducted, or 3) a method in which an addition reaction of a hydroxy-containing acrylic resin with an isocyanate-containing polymerizable unsaturated compound is conducted.

In particular, from the viewpoint of coating film appearance, repairability, etc., the polymerizable unsaturated group(s)-containing acrylic resin (A) is preferably a polymerizable unsaturated group(s)-containing acrylic resin obtained by method 1) in which an addition reaction of an epoxy-containing acrylic resin with a carboxy-containing polymerizable unsaturated compound is conducted.

The addition reaction of the functional group(s)-containing acrylic resin, such as an epoxy-containing acrylic resin, a carboxy-containing acrylic resin, or a hydroxy-containing acrylic resin, with the radically polymerizable unsaturated compound, such as a carboxy-containing polymerizable unsaturated compound, an epoxy-containing polymerizable unsaturated compound, or an isocyanate-containing polymerizable unsaturated compound, can be generally performed in an organic solvent at 40 to 160° C. using, if necessary, a catalyst. The functional group(s)-containing acrylic resin may be melted to perform addition reaction; however, the reaction is preferably conducted in an organic solvent for ease of production.

Next, a carboxy-containing polymerizable unsaturated compound, an epoxy-containing polymerizable unsaturated compound, and an isocyanate-containing polymerizable unsaturated compound for use in the addition reaction are described below.

Examples of carboxy-containing polymerizable unsaturated compounds (which hereinafter may be referred to as "carboxy-containing polymerizable unsaturated monomers") include (meth)acrylic acid, crotonic acid, isocrotonic acid, and like monocarboxylic acids; maleic acid, fumaric acid, itaconic acid, citraconic acid, chlorinated maleic acid, and like α,β-unsaturated dicarboxylic acids, or half esters thereof; and the like.

Typical examples of epoxy-containing polymerizable unsaturated compounds (which hereinafter may be referred to as "epoxy-containing polymerizable unsaturated monomers") include compounds containing one epoxy group and one radically polymerizable unsaturated group per molecule. Examples of such compounds include glycidyl (meth)acrylate, β-methylglycidyl (meth)acrylate, glycidyl vinyl ether, allyl glycidyl ether, and like epoxy-containing monomer compounds; (2-oxo-1,3-oxolane)methyl (meth)acrylate and like (2-oxo-1,3-oxolane) group-containing vinyl monomer compounds; 3,4-epoxycyclohexyl (meth)acrylate, 3,4-epoxycyclohexylmethyl (meth)acrylate, 3,4-epoxycyclohexylethyl (meth)acrylate, and like alicyclic epoxy-containing vinyl monomers; and the like.

Typical examples of isocyanate-containing polymerizable unsaturated compounds (which hereinafter may be referred to as "isocyanate-containing polymerizable unsaturated monomers") include compounds containing one isocyanate group and one radically polymerizable unsaturated group. Examples of such compounds include isocyanatomethyl (meth)acrylate, isocyanatoethyl (meth)acrylate, isocyanatopropyl (meth)acrylate, isocyanatooctyl (meth)acrylate, p-methacryloxy-α, α'-dimethylbenzyl isocyanate, m-acryloxy-α, α'-dimethylbenzyl isocyanate, m- or p-isopropenyl-α, α'-dimethylbenzyl isocyanate, and the like. Examples also include those obtained by reacting some of the isocyanates of a polyisocyanate compound with a hydroxy-containing polymerizable unsaturated compound.

The term "(meth)acrylate" used herein means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

Next, the functional group(s)-containing acrylic resin mentioned above, such as a carboxy-containing acrylic resin, an epoxy-containing acrylic resin, or a hydroxy-containing acrylic resin, is described below.

Various methods can be used for preparing the functional group(s)-containing acrylic resin. For example, a preferable and most convenient method is a method in which one or more polymerizable unsaturated monomers selected from carboxy-containing polymerizable unsaturated monomers, epoxy-containing polymerizable unsaturated monomers, and hydroxy-containing polymerizable unsaturated monomers in order to obtain the desired functional group(s)-containing acrylic resin, and, as necessary, one or more other polymerizable unsaturated monomers are subjected to a (co)polymerization reaction in an organic solvent.

As the carboxy-containing polymerizable unsaturated monomers and epoxy-containing polymerizable unsaturated monomers, the monomers mentioned above can be used.

Typical examples of hydroxy-containing polymerizable unsaturated monomers include compounds containing one hydroxy group and one radically polymerizable unsaturated group. Examples of such compounds include 2-hydroxyethyl (meth)acrylate, 2-hydroxypropyl (meth)acrylate, 3-hydroxypropyl (meth)acrylate, 4-hydroxybutyl (meth)acrylate, and like monoesterified products of (meth)acrylic acid with a dihydric alcohol containing 2 to 8 carbon atoms; ε-caprolactone-modified products of the monoesterified products of (meth)acrylic acid with a dihydric alcohol containing 2 to 8 carbon atoms; N-hydroxymethyl (meth)acrylamide; allyl alcohol; (meth)acrylates containing hydroxy-terminated polyoxyethylene chains; and the like.

In preparing the epoxy-containing acrylic resin, carboxy-containing polymerizable unsaturated monomers, isocyanate-containing polymerizable unsaturated monomers, and hydroxy-containing polymerizable unsaturated monomers are regarded as other polymerizable unsaturated monomers. In preparing the carboxy-containing acrylic resin, epoxy-containing polymerizable unsaturated monomers, isocyanate-containing polymerizable unsaturated monomers, and hydroxy-containing polymerizable unsaturated monomers are regarded as other polymerizable unsaturated monomers. In preparing the hydroxy-containing acrylic resin, carboxy-containing polymerizable unsaturated monomers, epoxy-containing polymerizable unsaturated monomers, and isocyanate-containing polymerizable unsaturated monomers are regarded as other polymerizable unsaturated monomers.

Examples of the other polymerizable unsaturated monomers include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, stearyl (meth)acrylate, and like alkyl (meth)acrylates; benzyl (meth)acrylate, phenyl (meth)acrylate, phenoxyethyl (meth)acrylate, tetrahydrofurfuryl (meth)acrylate, ethylcarbitol (meth)acrylate, and like alkyl carbitol (meth)acrylates; isobornyl (meth)acrylate, dicyclopentanyl (meth)acrylate, dicyclopentenyl (meth)acrylate, dicyclopentenyloxyethyl (meth)acrylate, and like (meth)acrylic acid esters; γ-(meth)acryloyloxypropyltrimethoxysilane, γ-(meth)acryloyloxypropyltriethoxysilane, γ-(meth)acryloyloxypropylmethyldimethoxysilane, and like hydrolyzable silyl-containing polymerizable unsaturated monomers; vinyl fluoride, vinylidene fluoride, trifluoroethylene, tetrafluoroethylene, chlorotrifluoroethylene, bromotrifluoroethylene, pentafluoropropylene, hexafluoropropylene, and like fluorine-containing α-olefinic compounds; fluorine-containing vinyl polymerizable unsaturated monomers, such as trifluoromethyl trifluorovinyl ether, pentafluoroethyl trifluorovinyl ether, heptafluoropropyl trifluorovinyl ether, and like perfluoroalkyl/perfluorovinyl ethers or (per)fluoroalkyl vinyl ethers (provided that alkyl has 1 to 18 carbon atoms); mono- or di-ester compounds of a polycarboxy-containing polymerizable unsaturated monomer typified by fumaric acid, maleic acid, itaconic acid, or the like with $C_{1-18}$ monoalkyl alcohol; styrene, vinyltoluene, α-methylstyrene, p-tert-butylstyrene, and like aromatic vinyl compounds; (meth)acrylamide, N-methyl (meth)acrylamide, N-ethyl (meth)acrylamide, N-n-propyl (meth)acrylamide, N-iso-propyl (meth)acrylamide, N-n-butyl (meth)acrylamide, N-iso-butyl (meth)acrylamide, N-tert-butyl (meth)acrylamide, N-amyl (meth)acrylamide, N-(meth)acrylamide, N-hexyl (meth)acrylamide, N-heptyl (meth)acrylamide, N-2-ethylhexyl (meth)acrylamide, N,N-dimethyl (meth)acrylamide, N,N-diethyl (meth)acrylamide, N-methylol (meth)acrylamide, N-methoxymethyl (meth)acrylamide, N-ethoxymethyl (meth)acrylamide, N-n-propoxymethyl. (meth)acrylamide, N-iso-propoxymethyl (meth)acrylamide, N-n-butoxymethyl (meth)acrylamide, N-iso-butoxymethyl (meth)acrylamide, N-tert-butoxymethyl (meth)acrylamide, N-amyloxymethyl acrylamide, N-hexyloxy (meth)acrylamide, N-heptyloxymethyl (meth)acrylamide, N-octyloxymethyl (meth)acrylamide, N-2-ethyl-hexyloxymethyl (meth)acrylamide, diacetone (meth)acrylamide, and like amide polymerizable unsaturated monomers; dimethylaminoethyl (meth)acrylate, diethylaminoethyl (meth)acrylate, tert-butylaminoethyl (meth) acrylate, tert-butylaminopropyl (meth)acrylate, and like dialkyl amino alkyl (meth)acrylate compounds; aziridinylethyl (meth)acrylate, pyrrolidinylethyl (meth)acrylate, piperidinylethyl (meth)acrylate, (meth)acryloylmorpholine, N-vinyl-2-pyrrolidone, N-vinylcaprolactam, N-vinyloxazoline, (meth)acrylonitrile, and like nitrogen-containing polymerizable unsaturated monomers; vinyl acetate, vinyl propionate, vinyl butyrate, vinyl isobutyrate, vinyl caproate, vinyl caprylate, vinyl caprate, vinyl laurate, $C_{9-11}$ branched aliphatic carboxylic acid vinyl esters, vinyl stearate, and like aliphatic carboxylic acid vinyl esters; vinyl cyclohexanecarboxylate, vinyl methylcyclohexanecarboxylate, vinyl benzoate, vinyl p-tert-butyl benzoate, and like vinyl ester compounds of carboxylic acids having a cyclic structure; ethyl vinyl ether, hydroxyethyl vinyl ether, hydroxy n-butyl vinyl ether, hydroxy isobutyl vinyl ether, cyclohexyl vinyl ether, lauryl vinyl ether, and like alkyl vinyl ether compounds; halogenated olefinic compounds other than the fluoroolefinic compounds, such as vinyl chloride and vinylidene chloride; ethylene, propylene, butene-1, and like α-olefinic compounds; 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy) benzophenone, 2-[2-hydroxy-5-[2-(methacryloyloxy)ethyl] phenyl]-2H-benzotriazole, and like polymerizable unsaturated monomers containing a UV-absorbing functional group; 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, and like photostable polymerizable unsaturated monomers; and the like.

Various polymerization initiators and organic solvents can be used as a polymerization initiator and an organic solvent to be used in the preparation of the functional group(s)-containing acrylic resin described above, such as a carboxy-containing acrylic resin, an epoxy-containing acrylic resin, or hydroxy-containing acrylic resin.

Examples of polymerization initiators include 2,2'-azobisisobutyronitrile, 2,2'-azobis-methylbutyronitrile, 2,2'-azobis-2,4-dimethylvaleronitrile, 1,1'-azobis-cyclohexanecarbonitrile, dimethyl-2,2'-azobisisobutyrate, 4,4'-azobis-4-cyanovaleric acid, 2,2'-azobis-(2-amidinopropene) dihydrochloride, 2-tert-butylazo-2-cyanopropane, 2,2'-azobis-(2-methyl-propionamide)dihydrate, 2,2'-azobis-[2-(2-imidazolin-2-yl)propene], 2,2'-azobis(2,2,4-trimethylpentane), and like azo compounds; benzoyl peroxide, methyl ethyl ketone peroxide, cumene hydroperoxide, potassium persulfate, tert-butyl peroxyneodecanoate, tert-butyl peroxypivalate, tert-butyl peroxy-2-ethylhexanoate, tert-butyl peroxyisobutyrate, 1,1-bis-tert-butyl peroxy-3,3,5-trimethylcyclohexane, tert-butyl peroxylaurate, tert-butyl peroxyisophthalate, tert-butyl peroxyacetate, tert-butyl peroxybenzoate, dicumyl peroxide, di-tert-butyl peroxide, and like ketone peroxide compounds; peroxyketal compounds; hydroperoxide compounds; dialkyl peroxide compounds; diacyl peroxide compounds; peroxy ester compounds; peroxy dicarbonate compounds; hydrogen peroxide; and the like.

Examples of organic solvents include methanol, ethanol, n-propanol, isopropanol, n-butanol, isobutanol, sec-butanol, tert-butanol, n-pentanol, isopentanol, and like alkyl alcohol solvents; methyl cellosolve, ethyl cellosolve, ethylene glycol dimethyl ether, ethylene glycol diethyl ether, propylene glycol monomethyl ether, propylene glycol monoethyl ether, propylene glycol monopropyl ether, propylene glycol dimethyl ether, propylene glycol diethyl ether, and like glycol ether solvents; benzene, toluene, xylene, ethylbenzene, and like aromatic hydrocarbon solvents; Exxon Aromatic Naphtha No. 2 (Exxon Corporation, USA) and like aromatic hydrocarbon-containing mixed hydrocarbon solvents; n-pentane, n-hexane, n-octane, and like aliphatic hydrocarbon solvents; Isopar C, Isopar E, Exxsol DSP100/140, Exxsol D30 (all produced by Exxon Corporation, USA), IP Solvent 1016 (produced by Idemitsu Petrochemical Co., Ltd.), and like aliphatic hydrocarbon-containing mixed hydrocarbon solvents; cyclopentane, cyclohexane, methylcyclohexane, ethylcyclohexane, and like alicyclic hydrocarbon solvents; tetrahydrofuran, dioxane, diisopropyl ether, di-n-butyl ether, and like ether solvents; acetone, methyl ethyl ketone, methyl isobutyl ketone, and like ketone solvents; methyl acetate, ethyl acetate, n-propyl acetate, isopropyl acetate, n-butyl acetate, isobutyl acetate, n-amyl acetate, isoamyl acetate, hexyl acetate, ethyl propionate, butyl propionate, and like ester solvents; and the like. These organic solvents may also be used with a small amount of water.

Further, a chain transfer agent may also be used as necessary in preparing the functional group(s)-containing acrylic resin. Examples of chain transfer agents include dodecyl mercaptan, lauryl mercaptan, thioglycolic acid esters, mercaptoethanol, α-methylstyrene dimer, and the like.

From the viewpoint of scratch resistance etc., it is preferred that the glass transition temperature (Tg) of the functional group(s)-containing acrylic resin is in the range of −20 to 100° C., and preferably −5 to 60° C.

In this specification, the glass transition temperature (Tg) of the functional group(s)-containing acrylic resin refers to a value calculated according to the following equation.

$$1/Tg(K) = W_1/T_1 + W_2/T_2 + \ldots W_n/T_n$$

$$Tg(° C.) = Tg(K) - 273$$

wherein $W_1, W_2 \ldots W_n$ are mass fractions of the respective monomers; and $T_1, T_2 \ldots T_n$ are glass transition temperatures Tg(K) of homopolymers of the respective monomers. The glass transition temperatures of homopolymers of the respective monomers are values shown in Polymer Handbook, Fourth Edition, edited by J. Brandrup, E. H. Immergut, and E. A. Grulke, 1999. When the glass transition temperature of a monomer is not shown in the Handbook, a homopolymer of the monomer having a weight average molecular weight of around 50,000 is synthesized, and the static glass transition temperature is determined.

The static glass transition temperature can be measured as follows. For example, a sample is taken in a measuring cup and subjected to vacuum suction to completely remove the solvent, followed by measurement of changes in the quantity of heat at a heating rate of 3° C./min in a temperature range of −100 to 150° C. using a DSC-50Q differential scanning calorimeter (produced by Shimadzu Corp., trade name). The initial change point in the baseline at the low temperature side is considered to be the static glass transition temperature.

From the viewpoint of coating film appearance, repairability, etc., it is preferred that the weight average molecular weight of the functional group(s)-containing acrylic resin is in the range of 4,500 to 29,500, preferably 5,500 to 19,500, and more preferably 6,500 to 11,500.

The polymerizable unsaturated group(s)-containing acrylic resin (A) may also be obtained by reacting a chain extension component for a hydroxy-containing compound with a resin produced by reacting the functional group(s)-containing acrylic resin with the radically polymerizable unsaturated compound containing a reactive group that is reactive with the functional group, and a polymerizable unsaturated group.

Specifically, for example, in method 1) or 2) described above, a hydroxy-containing polymerizable unsaturated monomer is used as a copolymerizable monomer component of the functional group(s)-containing acrylic resin, and the hydroxy derived from the monomer is reacted with the chain extension component for a hydroxy-containing compound; in method 1) or 2) described above, secondary hydroxy generated by an addition reaction of epoxy with carboxy is reacted with the chain extension component for a hydroxy-containing compound; or in method 3), the hydroxy in a hydroxy-containing acrylic resin is reacted with the chain extension component for a hydroxy-containing compound.

Examples of the chain extension component for a hydroxy-containing compound include ε-caprolactone, γ-valerolactone, and like lactone compounds; ethylene oxide, propylene oxide, and like alkylene oxide compounds; and the like.

One kind of the polymerizable unsaturated group(s)-containing acrylic resin (A) can be used singly or two or more kinds of the polymerizable unsaturated group(s)-containing acrylic resin (A) can be used in combination.

Urethane (Meth)Acrylate (B)

The urethane (meth)acrylate (B) is a urethane compound containing an average of two to four polymerizable unsaturated groups, preferably acryloyl groups, per molecule and having a weight average molecular weight in the range of 1,000 or more but less than 5,000.

In particular, from the viewpoint of repairability etc., the urethane (meth)acrylate (B) preferably contains an average of 2.5 to 3.5 (meth)acryloyl groups per molecule, more preferably an average of 2.5 to 3.5 acryloyl groups per molecule.

In this specification, the average number of polymerizable unsaturated groups per molecule of a compound is a theoretical value calculated from the equivalent ratio of starting materials used in the synthesis of the compound.

From the viewpoint of coating film appearance, repairability, etc., it is preferred that the weight average molecular weight of the urethane (meth)acrylate (B) is in the range of 1,500 to 4,500, and preferably 2,000 to 4,000.

From the viewpoint of scratch resistance, repairability, etc., it is preferred that the glass transition temperature (Tg) of the urethane (meth)acrylate (B) is in the range of −20° C. to 60° C., and preferably 0 to 40° C.

In this specification, the glass transition temperature (Tg) of the urethane (meth)acrylate (B) is a static glass transition temperature. The static glass transition temperature can be measured by, for example, the method described in the explanation of the polymerizable unsaturated group(s)-containing acrylic resin (A) above.

The urethane (meth)acrylate (B) may be, for example, a urethane (meth)acrylate (B1) obtained by reacting a polyisocyanate compound (b1) and a hydroxy-containing (meth) acrylate (b2) containing at least one hydroxy group and at least one (meth)acryloyl group per molecule, optionally with a polyol compound (b3) and/or a chain extension component for a hydroxy-containing compound (b4); a urethane (meth) acrylate (B2) obtained by reacting the polyol compound (b3) and an isocyanate-containing (meth)acrylate containing at least one isocyanate group and at least one (meth)acryloyl group per molecule (b5), optionally with the polyisocyanate compound (b1) and/or the chain extension component for a hydroxy-containing compound (b4); or the like.

Polyisocyanate Compound (b1)

The polyisocyanate compound (b1) is a compound containing at least two isocyanate groups per molecule.

Examples of the polyisocyanate compound (b1) include hexamethylene diisocyanate, trimethylhexamethylene diisocyanate, dimer acid diisocyanate, lysine diisocyanate, and like aliphatic diisocyanate compounds, and uretdione adducts, adduct-type adducts, biuret adducts, and isocyanurate ring adducts of such diisocyanates; isophorone diisocyanate, 4,4'-methylenebis(cyclohexylisocyanate), methylcyclohexane-2,4-diisocyanate, methylcyclohexane-2,6-diisocyanate, 1,3-di(isocyanatomethyl)cyclohexane, 1,4-di(isocyanatomethyl)cyclohexane, 1,4-cyclohexane diisocyanate, 1,3-cyclopentane diisocyanate, 1,2-cyclohexane diisocyanate, and like alicyclic diisocyanate compounds, and uretdione adducts, adduct-type adducts, biuret adducts, and isocyanurate ring adducts of such diisocyanates; xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m-phenylene diisocyanate, p-phenylene diisocyanate, 4,4'-biphenylene diisocyanate, 3,3'-dimethyl-4,4'-biphenylene diisocyanate, bis(4-isocyanatophenyl)sulfone, isopropylidene bis(4-phenylisocyanate), and like aromatic diisocyanate compounds, and uretdione adducts, adduct-type adducts, biuret adducts, and isocyanurate ring adducts of such diisocyanates; triphenylmethane-4,4', 4"-triisocyanate, 1,3,5-triisocyanatobenzene, 2,4,6-triisocyanatotoluene, 4,4'-dimethyldiphenylmethane-2,2', 5,5'-tetraisocyanate, and like polyisocyanate compounds containing at least three isocyanate groups per molecule, and uretdione adducts, adduct-type adducts, biuret adducts, and isocyanurate ring adducts of such polyisocyanates; urethanized adducts obtained by reacting a polyol, such as ethylene glycol, propylene glycol, 1,4-butylene glycol, dimethylolpropionic acid, polyalkylene glycol, trimethylolpropane, or hexanetriol, with a polyisocyanate compound at a ratio such that the isocyanate groups of the polyisocyanate compound become excessive relative to the hydroxy groups of the polyol, and biuret adducts and isocyanurate ring adducts of such polyisocyanates; and the like.

From the viewpoint of coating film appearance, repairability, etc., isocyanurate ring adducts of aliphatic polyisocyanate compounds, in particular, isocyanurate ring adducts of hexamethylene diisocyanate, can be preferably used as the polyisocyanate compound (b1).

Hydroxy-Containing (Meth)Acrylate (b2)

The hydroxy-containing (meth)acrylate (b2) is a compound containing at least one hydroxy group and at least one (meth)acryloyl group per molecule.

Examples of the hydroxy-containing (meth)acrylate (b2) include 2-hydroxyethyl (meth)acrylate, 2-hydroxypropyl (meth)acrylate, 3-hydroxypropyl (meth)acrylate, 4-hydroxybutyl (meth)acrylate, and like monoesterified products of (meth)acrylic acid with a dihydric alcohol containing 2 to 8 carbon atoms; ε-caprolactone-modified products of the monoesterified product of (meth)acrylic acid with a dihydric alcohol containing 2 to 8 carbon atoms; N-hydroxymethyl (meth)acrylamide; allyl alcohol, further (meth)acrylates containing hydroxy-terminated polyoxyalkylene chains; glycerin di(meth)acrylate, trimethylolpropane di(meth)acrylate, pentaerythritol di(meth)acrylate, and like di(meth)acrylate compounds; pentaerythritol tri(meth)acrylate and like tri(meth)acrylate compounds; and the like.

Polyol Compound (b3)

The polyol compound (b3) is a compound that contains at least two hydroxy groups per molecule and that is different from the hydroxy-containing (meth)acrylate (b2).

Examples of the polyol compound (b3) include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F, dimethylolpropionic acid, and like dihydric alcohols; polylactone diols obtained by adding lactone compounds, such as ε-caprolactone, to such dihydric alcohols; bis(hydroxyethyl) terephthalate and like ester diol compounds; alkylene oxide adducts of bisphenol A, polyethylene glycol, polypropylene glycol, polybutylene glycol, and like polyether diol compounds; glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol, mannitol, and like trihydric or higher alcohols; polylactone polyol compounds obtained by adding lactone compounds, such as ε-caprolactone, to such trihydric or higher alcohols; fatty acid esters of glycerin; and the like.

Chain Extension Component for Hydroxy-Containing Compound (b4)

The chain extension component for a hydroxy-containing compound (b4) is a compound that can react with hydroxy-containing compounds, such as the hydroxy-containing (meth)acrylate (b2) and the polyol compound (b3), to extend a molecular chain.

Examples of the chain extension component for a hydroxy-containing compound (b4) include ε-caprolactone, γ-valerolactone, and like lactone compounds; ethylene oxide, propylene oxide, and like alkylene oxide compounds; and the like.

Isocyanate-Containing (Meth)Acrylate (b5)

The isocyanate-containing (meth)acrylate (b5) is a compound containing at least one isocyanate group and at least one (meth)acryloyl group per Molecule.

Examples of the isocyanate-containing (meth)acrylate (b5) include isocyanatomethyl (meth)acrylate, isocyanatoethyl (meth)acrylate, isocyanatopropyl (meth)acrylate, isocyanatobutyl (meth)acrylate, isocyanatooctyl (meth)acrylate, p-methacryloxy-α,α'-dimethylbenzyl isocyanate, m-acryloxy-α, α'-dimethylbenzyl isocyanate, m- or p-isopropenyl-α, α'-dimethylbenzyl isocyanate, 1,1-bis((meth) acryloyloxymethyl)ethyl isocyanate, reaction products of 1 mol of hydroxyalkyl (meth)acrylate and 1 mol of a diisocyanate compound, specifically, compounds obtained by an equimolar addition reaction of a compound containing two isocyanate groups that differ in reactivity, such as isophorone diisocyanate, with a hydroxy-containing polymerizable unsaturated monomer, such as 2-hydroxyethyl (meth)acrylate or 4-hydroxybutyl (meth)acrylate; and the like.

The urethane (meth)acrylate (B) can be synthesized by subjecting a hydroxy-containing component and an isocyanate-containing component to a known urethanization reaction.

The above reaction can be generally carried out in an organic solution. Examples of organic solvents include aromatic hydrocarbon solvents, such as toluene and xylene; ketone solvents, such as acetone, methyl ethyl ketone, methyl isobutyl ketone, and cyclohexanone; ester solvents, such as ethyl acetate, propyl acetate, isobutyl acetate, and butyl acetate; and the like. These can be used singly, or as a mixture of two or more.

The reaction temperature is preferably room temperature to 100° C., and the reaction time is preferably 1 to 10 hours.

In the above urethanization reaction, the progress of the reaction can be confirmed by monitoring the isocyanate equivalent of the reaction liquid. The isocyanate equivalent can be determined by back titration using dibutylamine. More specifically, the back titration can be performed in such a manner that an excess amount of dibutylamine is reacted with a sample, and the remaining dibutylamine is titrated with an aqueous hydrochloric acid solution using bromophenol blue as a titration indicator.

In the above reaction, an organic tin catalyst, such as dibutyltin dilaurate, dibutyltin diethylhexoate, or dibutyltin sulfite, may be used, if necessary. The amount of the catalyst is preferably 0.01 to 1.0 part by mass, and more preferably 0.1 to 0.5 parts by mass, based on 100 parts by mass of the total amount of the reaction starting materials. Further, a polymerization inhibitor, such as hydroquinone monomethyl ether, may be used. When a polymerization inhibitor is used, the amount of the polymerization inhibitor is preferably 0.01 to 1.0 part by mass based on 100 parts by mass of the total amount of the reaction starting materials.

One kind of the urethane (meth)acrylate (B) can be used singly or two or more kinds of the urethane (meth)acrylate (B) can be used in combination.

Polymerizable Unsaturated Compound (C)

The polymerizable unsaturated compound (C) is a compound containing an average of two to nine polymerizable unsaturated groups per molecule and having a weight average molecular weight in the range of 200 or more but less than 1,000.

In particular, from the viewpoint of repairability etc., it is preferred that the polymerizable unsaturated compound (C)

has an average of two to seven, and preferably two to six polymerizable unsaturated groups per molecule.

It is particularly preferred from the viewpoint of repairability etc., that the polymerizable unsaturated compound (C) contains two to nine, preferably two to seven, and more preferably two to six polymerizable unsaturated groups per molecule.

From the viewpoint of coating film appearance, repairability, etc., it is preferred that the polymerizable unsaturated compound (C) has a weight average molecular weight in the range of 220 to 800, and preferably 240 to 700.

It is also preferred from the viewpoint of coating film appearance, repairability, etc., that the polymerizable unsaturated compound (C) has an unsaturated equivalent in the range of 50 to 250 g/mol, preferably 65 to 225 g/mol, and more preferably 80 to 200 g/mol.

Examples of the polymerizable unsaturated compound (C) include esterified products of a polyhydric alcohol with (meth)acrylic acid. Specific examples include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth) acrylate, tripropylene glycol di(meth)acrylate, tetrapropylene glycol di(meth)acrylate, polypropylene glycol di(meth) acrylate, 1,3-butanediol di(meth)acrylate, 1,4-butanediol di(meth)acrylate, 1,9-nonanediol di(meth)acrylate, neopentyl glycol di(meth)acrylate, 1,6-hexanediol di(meth)acrylate, bisphenol A ethylene oxide-modified di(meth)acrylate, isocyanuric acid ethylene oxide-modified di(meth)acrylate, tricyclodecanedimethanol di(meth)acrylate, isosorbide di(meth)acrylate, and like di(meth)acrylate compounds; glycerin tri(meth)acrylate, glycerin ethylene oxide-modified tri(meth)acrylate, glycerin propylene oxide-modified tri (meth)acrylate, trimethylol propane tri(meth)acrylate, trimethylolpropane ethylene oxide-modified tri(meth)acrylate, trimethylolpropane propylene oxide-modified tri(meth)acrylate, isocyanuric acid ethylene oxide-modified tri(meth) acrylate, pentaerythritol tri(meth)acrylate, ε-caprolactone-modified tris(acryloxyethyl)isocyanurate, and like tri(meth) acrylate compounds; pentaerythritol tetra(meth)acrylate, pentaerythritol ethylene oxide-modified tetra(meth)acrylate, pentaerythritol propylene oxide-modified tetra(meth)acrylate, ditrimethylolpropane tetra(meth)acrylate, ditrimethylolpropane ethylene oxide-modified tetra(meth)acrylate, ditrimethylolpropane propylene oxide-modified tetra(meth) acrylate, diglycerin tetra(meth)acrylate, diglycerin ethylene oxide-modified tetra(meth)acrylate, diglycerin propylene oxide-modified tetra(meth)acrylate, and like tetra(meth) acrylate compounds; dipentaerythritol penta(meth)acrylate; dipentaerythritol hexa(meth)acrylate; and the like.

One kind of the polymerizable unsaturated compound (C) can be used singly or two or more kinds of the polymerizable unsaturated compound (C) can be used in combination.

Photopolymerization Initiator (D)

The photopolymerization initiator (D) is a compound that absorbs active energy rays and generates free radicals (also in the form of intermediates), or a mixture of such compounds.

Examples of the photopolymerization initiator (D) include photochemically activatable compounds (e.g., benzoin); combinations of chromophores and co-initiators (e.g., benzophenone and tertiary amine) and mixtures thereof; combinations of sensitizers with co-initiators (e.g., thioxanthone with tertiary amine) or with chromophores (e.g., thioxanthone with aminoketone); redox systems, such as combinations of $H_2O_2$ with iron (II) salts; electron-transfer pairs, such as dyes and borates and/or amines; and the like.

Specific examples of the photopolymerization initiator (D) include benzyl, diacetyl, and like α-diketone compounds; benzoin and like acyloin compounds; benzoin methyl ether, benzoin ethyl ether, benzoin isopropyl ether, and like acyloin ether compounds; thioxanthone, 2,4-diethylthioxanthone, 2-isopropylthioxanthone, thioxanthone-4-sulfonic acid, and like thioxanthone compounds; benzophenone, o-methylbenzoylbenzoate, 4-methylbenzophenone, 4-phenylbenzophenone, 4,4'-bis(dimethylamino)benzophenone, 4,4'-bis(diethylamino)benzophenone, and like benzophenone compounds; Michler's ketone compounds; acetophenone, 2-(4-toluenesulfonyloxy)-2-phenylacetophenone, p-dimethylaminoacetophenone, α, α'-dimethoxyacetoxybenzophenone, 2,2'-dimethoxy-2-phenylacetophenone, p-methoxyacetophenone, 2-methyl[4-(methylthio)phenyl]-2-morpholino-1-propanone, 2-benzyl-2-dimethylamino-1-(4-morpholinophenyl)-butan-1-one, α-isohydroxy isobutylphenon, α,α'-dichloro-4-phenoxyacetophenone, 1-hydroxycyclohexyl-phenyl-ketone, and like acetophenone compounds; 2,4,6-trimethylbenzoyldiphenylphosphine oxide, bis(acyl)phosphine oxide, and like acylphosphine oxide compounds; anthraquinone, 1,4-naphthoquinone, and like quinone compounds; phenacyl chloride, trihalomethylphenylsulfone, tris(trihalomethyl)-s-triazine, and like halogen compounds; di-t-butyl peroxide and like peroxides; and the like.

Examples of commercially available products of the photopolymerization initiator (D) include Irgacure-127, Irgacure-184, Irgacure-261, Irgacure-369, Irgacure-500, Irgacure-651, Irgacure-754, Irgacure-819, Irgacure-907, Irgacure-CGI-1700, Irgacure-2959, Irgacure-TPO, and Darocur-1173 (trade names of BASF SE); Kayacure-MBP, Kayacure-DETX-S, Kayacure-DMBI, Kayacure-EPA, and Kayacure-OA (trade names of Nippon Kayaku Co., Ltd.); Vicure-10 and Vicure-55 (trade names of Stauffer Co., Ltd.); Trigonal P1 (trade name of Akzo Co., Ltd.); Sandoray 1000 (trade name of Sandoz Co., Ltd.); Deap (trade name of Apjohn Co., Ltd.); Quantacure-PDO, Quantacure-ITX, and Quantacure-EPD (trade names of Ward Blenkinsop Co., Ltd.); Esacure KIP 150 and Esacure ONE (trade names of Lamberti); and the like.

One kind of the photopolymerization initiator (D) can be used singly or two or more kinds of the photopolymerization initiator (D) can be used in combination.

Active Energy Ray-Curable Coating Composition

The active energy ray-curable coating composition of the present invention is a coating composition comprising the polymerizable unsaturated group(s)-containing acrylic resin (A), the urethane (meth)acrylate (B), the polymerizable unsaturated compound (C), and the photopolymerization initiator (D), which are described above.

The proportions of the polymerizable unsaturated group(s)-containing acrylic resin (A), the urethane (meth) acrylate (B), and the polymerizable unsaturated compound (C) in the active energy ray-curable coating composition of the present invention are preferably in the following ranges based on the total solids content of the components (A), (B), and (C), from the viewpoint of coating film appearance, repairability, etc.:

polymerizable unsaturated group(s)-containing acrylic resin (A): 20 to 70 mass %, preferably 25 to 65 mass %, and more preferably 30 to 60 mass %, urethane (meth)acrylate (B): 10 to 60 mass %, preferably 20 to 55 mass %, and more preferably 30 to 50 mass %, polymerizable unsaturated compound (C): 1 to 30 mass %, preferably 4 to 26 mass %, and more preferably 8 to 22 mass %.

From the viewpoint of repairability etc., it is preferred that the amount of the photopolymerization initiator (D) in the active energy ray-curable coating composition of the present invention is, on a solids basis, in the range of 0.1 to 20 parts by mass, preferably 0.5 to 15 parts by mass, and more preferably 1.0 to 10 parts by mass, per 100 parts by mass of the total solids content of the components (A), (B), and (C).

Moreover, the active energy ray-curable coating composition of the present invention is an active energy ray-curable coating composition in which the molecular weight between crosslinks of a cured coating film obtained by applying the active energy ray-curable coating composition is in the range of 300 to 900 g/mol.

The active energy ray-curable coating composition of the present invention relates to an uncured coating composition.

In the present invention, the molecular weight between crosslinks of the cured coating film is a theoretical value calculated by applying the minimum storage modulus to the following rubber viscoelasticity theoretical equation in dynamic viscoelasticity measurement carried out when the tan δ value of a sample is measured with dynamic viscoelasticity measuring device Rheogel E-400 (produced by UBM) at a temperature increase rate of 4° C./min in a temperature range of −25 to 200° C. at a frequency of 11 Hz.

$$Mc = 3\rho RT/Emin \qquad \text{Equation 1:}$$

wherein
Mc: molecular weight between crosslinks (g/mol);
$\rho$: density of a sample coating film (g/cm$^3$);
R: gas constant (8.314 J/K/mol);
T: absolute temperature (K) at which the storage modulus is minimum;
Emin: minimum storage modulus (MPa).

The sample is prepared as follows. First, the active energy ray-curable coating composition of the present invention is applied to a polypropylene plate to a cured film thickness of 30±5 μm, allowed to stand for 2 minutes, and heated at 80° C. for 3 minutes to volatilize the solvent in the active energy ray-curable coating composition. Next, UV irradiation is performed using a metal halide lamp at 400 mW/cm$^2$, 1500 mJ/cm$^2$, to form a cured coating film. Thereafter, the cured coating film is cut into strips having a length of 20 mm and a width of 5 mm and peeled off from the polypropylene plate to obtain a free coating film in the form of a strip as a sample.

The molecular weight between crosslinks of the cured coating film is preferably in the range of 320 to 750 g/mol, and more preferably 340 to 700 g/mol, from the viewpoint of repairability etc.

The molecular weight between crosslinks of the cured coating film can be adjusted by, for example, adjusting the unsaturated equivalent of the polymerizable unsaturated group(s)-containing acrylic resin (A), the urethane (meth) acrylate (B), and the polymerizable unsaturated compound (C) or adjusting the proportions of the components (A), (B), and (C).

From the viewpoint of scratch resistance, repairability, etc., it is preferred that a cured coating film obtained by applying the active energy ray-curable coating composition has a glass transition temperature in the range of 20 to 80° C., preferably 25 to 75° C., and more preferably 30 to 70° C.

In the present invention, the glass transition temperature of the cured coating film is a dynamic glass transition temperature measured as the temperature at which the tan δ (loss modulus/storage modulus) shows the maximum value in the dynamic viscoelasticity measurement in the measurement of the molecular weight between crosslinks.

The glass transition temperature of the cured coating film can be adjusted by, for example, adjusting the glass transition temperature of the polymerizable unsaturated group(s)-containing acrylic resin (A), the urethane (meth)acrylate (B), and the polymerizable unsaturated compound (C) or adjusting the proportions of the components (A), (B), and (C). More specifically, the glass transition temperature of the cured coating film can be adjusted by adjusting the glass transition temperature of copolymerizable monomers in the polymerizable unsaturated group(s)-containing acrylic resin (A).

The active energy ray-curable coating composition of the present invention may further comprise an ultraviolet absorber and/or a light stabilizer.

The ultraviolet absorber may be a known ultraviolet absorber. Examples include benzotriazole absorbers, triazine absorbers, salicylic acid derivative absorbers, benzophenone absorbers, and the like. The ultraviolet absorber may be a polymerizable unsaturated group(s)-containing ultraviolet absorber.

Specific examples of benzotriazole absorbers include 2-(2'-hydroxy-5'-methylphenyl)benzotriazole, 2-(2'-hydroxy-5'-t-butylphenyl)benzotriazole, 2-(2'-hydroxy-3', 5'-di-t-butylphenyl)benzotriazole, 2-(2'-hydroxy-3'-t-butyl-5'-methylphenyl)-5-chlorobenzotriazole, 2-(2'-hydroxy-3', 5'-di-t-butylphenyl)-5-chlorobenzotriazole, 2-(2'-hydroxy-3', 5'-di-t-amylphenyl)benzotriazole, 2-(2'-hydroxy-4'-octoxyphenyl)benzotriazole, 2-{2'-hydroxy-3'-(3",4",5",6"-tetrahydrophthalimidemethyl)-5'-methylphenyl}benzotriazole, 2-[2-hydroxy-5-[2-(methacryloyloxy)ethyl]phenyl]-2H-benzotriazole, and the like.

Specific examples of triazine absorbers include 2,4-bis(2, 4-dimethylphenyl)-6-(2-hydroxy-4-isooctyloxyphenyl)-1,3, 5-triazine, 2-[4((2-hydroxy-3-dodecyloxypropyl)-oxy)-2-hydroxyphenyl]-4,6-bis(2,4-dimethylphenyl)-1,3,5-triazine, 2-[4-((2-hydroxy-3-tridecyloxypropyl)-oxy)-2-hydroxyphenyl]-4,6-bis(2,4-dimethylphenyl)-1,3,5-triazine, 2-(2,4-dihydroxyphenyl)-4,6-bis(2,4-dimethylphenyl)-1,3,5-triazine, and the like.

Specific examples of salicylic acid derivative absorbers include phenyl salicylate, p-octylphenyl salicylate, 4-tert-butylphenyl salicylate, and the like.

Specific examples of benzophenone absorbers include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4, 4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2', 4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, 2,2'-dihydroxy-4(3-methacryloxy-2-hydroxypropoxy)benzophenone, and the like.

Examples of commercially available ultraviolet absorbers include Tinuvin 900, Tinuvin 928, Tinuvin 348-2, Tinuvin 479, Tinuvin 405, and Tinuvin 400 (trade names of BASF SE; Tinuvin is a registered trademark); Ruva 93 (trade name of Otsuka Chemical Co., Ltd.); and the like.

When the active energy ray-curable coating composition of the present invention comprises an ultraviolet absorber, it is preferred that the amount of the ultraviolet absorber is in the range of 0.5 to 10 mass %, preferably 0.8 to 9 mass %, and more preferably 1.0 to 8 mass %, based on the total solids content of the active energy ray-curable coating composition.

"Solids content" as used herein refers to the non-volatile components of the resin(s), additive(s), pigment(s), etc. remaining in the composition after drying at 110° C. for 1 hour. For example, the total solids content of the active energy ray-curable coating composition of the present invention can be calculated as follows. The active energy ray-curable coating composition is measured in a heat-resistant container such as an aluminum foil cup, spread at the bottom of the container, and then dried at 110° C. for 1 hour, after which the mass of the components in the active energy ray-curable coating composition remaining after drying is measured to determine the ratio of the mass of the components remaining after drying with respect to the total mass of the active energy ray-curable coating composition before drying.

The light stabilizer is used as a radical chain inhibitor that captures active radicals generated during the deterioration of the coating film. For example, a light stabilizer comprising a hindered amine compound can be used.

Light stabilizers that exhibit particularly excellent light stabilization properties include hindered piperidine compounds. Examples of hindered piperidine compounds include, but are not limited to, monomeric hindered piperidine compounds, such as bis(1,2,2,6,6-pentamethyl-4-piperidyl) sebacate, bis(2,2,6,6-tetramethyl-4-piperidinyl) sebacate, bis(N-methyl-2,2,6,6-tetramethyl-4-piperidinyl) sebacate, 4-benzoyloxy-2,2', 6,6'-tetramethylpiperidine, and bis(1,2,2,6,6-pentamethyl-4-piperidyl){[3,5-bis(1,1-dimethylethyl)-4-hydroxyphenyl]methyl} butylmalonate; oligomeric hindered piperidine compounds, such as poly{[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)iminol]}; polyester-hindered piperidines, such as polyesters of 4-hydroxy-2,2,6,6-tetramethyl-1-piperidineethanol and succinic acid; and the like. Known polymerizable light stabilizers are also usable as the light stabilizer.

Examples of commercially available products of the light stabilizer include Tinuvin 123, Tinuvin 152, and Tinuvin 292 (trade names of BASF SE; Tinuvin is a registered trademark); Hostavin 3058 (trade name of Clariant; Hostavin is a registered trademark); ADK STAB LA-82 (trade name of ADEKA; ADK STAB is a registered trademark); and the like.

When the active energy ray-curable coating composition of the present invention comprises a light stabilizer, it is preferred that the amount of the light stabilizer is in the range of 0.5 to 10 mass %, preferably 0.8 to 9 mass %, and more preferably 1.0 to 8 mass %, based on the total solids content of the active energy ray-curable coating composition.

The active energy ray-curable coating composition of the present invention may further comprise one or more polymerizable unsaturated compounds other than the components (A), (B), and (C).

Compounds containing one polymerizable unsaturated group per molecule can be preferably used as the one or more polymerizable unsaturated compounds other than the components (A), (B), and (C).

Examples of polymerizable unsaturated compounds other than the components (A), (B), and (C) include esterified products of (meth)acrylic acid with monohydric alcohol, hydroxy-containing (meth)acrylates, glycidyl-containing (meth)acrylates, carboxy-containing (meth)acrylates, vinyl aromatic compounds, nitrogen-containing alkyl (meth)acrylates, polymerizable amide compounds, polymerizable unsaturated group-containing hydrolyzable silane compounds, and the like.

Examples of esterified products of (meth)acrylic acid with a monohydric alcohol include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, neopentyl (meth)acrylate, cyclohexyl (meth)acrylate, tetrahydrofurfuryl (meth)acrylate, isobornyl (meth)acrylate, phenyl (meth)acrylate, benzyl (meth)acrylate, N-acryloyloxyethyl hexahydrophthalimide, and the like.

Examples of hydroxy-containing (meth)acrylates include hydroxyethyl (meth)acrylate, hydroxypropyl (meth)acrylate, hydroxybutyl (meth)acrylate, and the like.

Examples of carboxy-containing (meth)acrylates include acrylic acid, methacrylic acid, crotonic acid, itaconic acid, maleic acid, fumaric acid, 2-carboxyethyl (meth)acrylate, 2-carboxypropyl (meth)acrylate, 5-carboxypentyl (meth) acrylate, and the like.

Examples of glycidyl-containing (meth)acrylates include glycidyl (meth)acrylate, allyl glycidyl ether, and the like.

Examples of vinyl aromatic compounds include styrene, α-methylstyrene, vinyltoluene, α-chlorostyrene, and the like.

Examples of nitrogen-containing alkyl (meth)acrylates include N,N-dimethylaminoethyl (meth)acrylate, N,N-diethylaminoethyl (meth)acrylate, N-t-butylaminoethyl (meth)acrylate, 4-(meth)acryloylmorpholine, and the like.

Examples of polymerizable amide compounds include acrylamide, methacrylamide, N-methyl (meth)acrylamide, N-ethyl (meth)acrylamide, N-methoxymethyl (meth)acrylamide, N-butoxymethyl (meth)acrylamide, N,N-dimethyl (meth)acrylamide, N,N-dimethylaminopropyl (meth)acrylamide, N,N-dimethylaminoethyl (meth)acrylamide, N-hydroxymethyl (meth)acrylamide, N-hydroxyethyl (meth) acrylamide, and the like.

Examples of polymerizable unsaturated group-containing hydrolyzable silane compounds include 3-(meth)acryloyloxypropyltrimethoxysilane, 2-(meth)acryloyloxyethyltrimethoxysilane, 3-(meth)acryloyloxypropyltriethoxysilane, 2-(meth)acryloyloxyethyltriethoxysilane, 3-(meth)acryloyloxypropylmethyldimethoxysilane, and the like.

The active energy ray-curable coating composition of the present invention may further comprise, if necessary, other additives generally used in the field of coating, such as crosslinking agents, solvents, pigments, catalysts, antioxidants, surface control agents, antifoaming agents, emulsifiers, surfactants, antifouling agents, wetting agents, thickeners, dyes, scratch resistance improvers, and gloss-controlling agents.

For example, when at least one of the components (A), (B), and (C) contains hydroxy, the polyisocyanate compound (b1) described above, blocked polyisocyanate compounds, melamine resins, and the like are usable as crosslinking agents. For example, when at least one of the components (A), (B), and (C) contains carboxy, carbodiimide compounds and the like are usable as crosslinking agents.

As solvents, for example, organic solvents, water, and the like are usable. Examples of organic solvents include acetone, methyl ethyl ketone, methyl isobutyl ketone, and like ketones; ethyl acetate, butyl acetate, methyl benzoate, ethyl ethoxypropionate, ethyl propionate, methyl propionate, and like esters; tetrahydrofuran, dioxane, dimethoxyethane, and like ethers; ethylene glycol monomethyl ether, ethylene glycol monoethyl ether, diethylene glycol monomethyl ether, propylene glycol monomethyl ether acetate, 3-methoxybutyl acetate, and like glycol ethers; aromatic hydrocarbons; aliphatic hydrocarbons; and the like.

Although the active energy ray-curable coating composition of the present invention may be either an organic solvent-based coating composition or an aqueous coating composition, an organic solvent-based coating composition is preferable from the viewpoint of storage stability of the coating composition. In this specification, aqueous coating compositions refer to coating compositions that contain water as a main component of the solvent, and organic solvent-based coating compositions refer to coating compositions that do not substantially contain water as the solvent.

Examples of pigments include effect pigments, color pigments, extender pigments, and the like. The pigments can be used singly or in a combination of two or more.

Examples of effect pigments include aluminum (such as vapor-deposited aluminum), copper, zinc, brass, nickel, glass flakes, aluminum oxide, mica, aluminum oxide coated with titanium oxide and/or iron oxide, mica coated with titanium oxide and/or iron oxide, and the like.

Examples of color pigments include titanium oxide, zinc oxide, carbon black, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, and the like.

Examples of extender pigments include clay, kaolin, barium sulfate, barium carbonate, calcium carbonate, talc, silica, alumina white, and the like.

The active energy ray-curable coating composition of the present invention can be prepared by, for example, mixing, and dissolving or dispersing, the polymerizable unsaturated group(s)-containing acrylic resin (A), the urethane (meth) acrylate (B), the polymerizable unsaturated compound (C), the photopolymerization initiator (D), and optionally additives in a solvent.

Cured Coating Film

A cured coating film is obtained by curing the active energy ray-curable coating composition of the present invention. The present invention also relates to such a cured coating film.

Curing of the active energy ray-curable coating composition can be performed by applying the coating composition to a substrate to form an uncured coating film and then irradiating the uncured coating film with active energy rays.

The cured coating film of the active energy ray-curable coating composition has a molecular weight between crosslinks in the range of 300 to 900 g/mol. From the viewpoint of repairability etc., the molecular weight between crosslinks is preferably in the range of 320 to 750 g/mol, and more preferably 340 to 700 g/mol.

From the viewpoint of scratch resistance, repairability, etc., it is also preferred that the cured coating film has a glass transition temperature in the range of 20 to 80° C., preferably 25 to 75° C., and more preferably 30 to 70° C.

Method for Forming Coating Film

A coated article comprising a cured coating film on a substrate can be obtained by applying the active energy ray-curable coating composition of the present invention to a substrate to form an uncured coating film and then irradiating the uncured coating film with active energy rays to cure the coating film. The present invention also relates to such a method for forming a coating film and to such a coated article.

Substrate

Materials for the substrate are not particularly limited and may be inorganic materials, organic materials, or organic-inorganic hybrid materials.

Examples of inorganic materials include metallic materials, such as iron, aluminum, brass, copper, tin plate, stainless steel, galvanized steel, and steel plated with zinc alloy (Zn—Al, Zn—Ni, Zn—Fe, etc.); glass; cement; concrete; and the like.

Examples of organic materials include polymethyl methacrylate and like acrylic resins, polyethylene terephthalate, polyethylene naphthalate, poly-1,4-cyclohexanedimethylene terephthalate, polyethylene-1,2-diphenoxyethane-4,4'-dicarboxylate, polybutylene terephthalate, and like polyester resins, epoxy resins typified by commercially available products such as Epikote (trade name, produced by YUKA Shell Epoxy Co.), polycarbonate resins, polyimide resins, novolac resins, phenol resins, acrylonitrile-butadiene-styrene (ABS) resins, acrylonitrile-ethylene-styrene (AES) resins, acrylonitrile-styrene-acrylate (ASA) resins, vinylidene chloride resins, polyurethane resins, cellulose esters (e.g., triacetyl cellulose, diacetyl cellulose, propionyl cellulose, butyryl cellulose, acetyl propionyl cellulose, and nitrocellulose), polyamides, polystyrenes (e.g., syndiotactic polystyrene), polyolefins (e.g., polypropylene, polyethylene, and polymethylpentene), polysulfones, polyether sulfones, polyarylates, polyether imides, polyether ketones, various fiber reinforced plastics (which hereinafter is referred to as "FRP materials" or simply "FRP"), and the like.

The substrate may be, for example, a material, such as an inorganic material, an organic material, or an organic-inorganic hybrid material described above, having a primer layer, an electrodeposition coating film layer, an intermediate coat layer, a top coat layer, etc., formed on it beforehand by applying a primer coating composition, a cationic electrodeposition coating composition, an intermediate coating composition, a top coating composition, etc. to the material.

Use of the substrate coated with the active energy ray-curable coating composition of the present invention is not particularly limited. For example, the substrate can be used for exterior body panels of vehicles, such as cars, trucks, motorbikes, and buses; interior and exterior automobile parts, such as bumpers, center pillars, mirrors, door handles, instrument panels, door trim, and center consoles; exterior panels of home electric appliances, such as mobile phones and audio equipment; and the like.

The coating film formed from the active energy ray-curable coating composition of the present invention has excellent coating film appearance and repairability. Thus, the coating film can be particularly preferably used for exterior body panels of vehicles and automobile parts.

Coating Step

The method for applying the active energy ray-curable coating composition of the present invention is not particularly limited. For example, the coating composition can be applied by air spraying, airless spraying, rotary atomization coating, dip coating, brushing, or the like. An electrostatic charge may be applied during coating. The thickness of the coating film when cured is generally 10 to 100 µm, preferably 15 to 75 µm, and more preferably 20 to 50 µm.

The method for forming a coating film according to the present invention preferably comprises applying the active energy ray-curable coating composition to a substrate, setting and/or preheating the composition to adjust the solids content of the obtained coating film to 90 mass % or more, and then irradiating the coating film with active energy rays.

Polymerization Step

The coating film on the substrate can be formed into a cured coating film by irradiating the coating film with active energy rays for polymerization.

Active-Energy-Ray Irradiation

Known active energy rays can be used for irradiation. Specific examples include ultraviolet rays, visible rays, laser beams (e.g., near-infrared lasers, visible-light lasers, ultraviolet lasers), microwaves, electron beams, electromagnetic waves, and the like.

Of these active energy rays, ultraviolet rays can be preferably used from the viewpoint of economy.

Active-energy-ray irradiation can be performed using any light source that emits electromagnetic waves of wavelengths that can be absorbed by the photopolymerization initiator (D) in the active energy ray-curable coating composition. Such a light source is a light source that generally emits electromagnetic waves of wavelengths in the range of 200 nm to 2,000 nm.

Examples of sources of active energy rays include known sources, specifically, such as extra-high-pressure, high-pressure, medium-pressure, or low-pressure mercury lamps, electrodeless lamps, chemical lamps, carbon arc lamps, xenon lamps, metal halide lamps, fluorescent lights, tungsten lamps, LEDs (light emitting diodes), and sunlight. Also usable is a pulse-emission active-energy-ray irradiation device.

Some or all of an area may be irradiated, for example, with active-energy-ray irradiation through a mask or using a laser beam. Using this method, it is also possible to cure the coating in certain regions only.

The exposure dose of active energy rays is not limited as long as polymerization of the active energy ray-curable coating composition can be achieved. When a high-pressure mercury lamp is used, the exposure dose is, for example, generally in the range of 50 to 3,000 $mJ/cm^2$, and particularly preferably 100 to 1,500 $mJ/cm^2$. When a metal halide lamp is used, the exposure dose is, for example, generally in the range of 100 to 5,000 $mJ/cm^2$, and particularly preferably 500 to 2,500 $mJ/cm^2$.

Active-energy-ray irradiation may be performed in air or inert gas. Examples of usable inert gas include nitrogen gas, carbon dioxide, argon, helium, and like gases, and mixtures thereof.

Heating may be performed in addition to curing with active energy rays. As heating means, hot air, hot gas, an infrared heater, an IR radiator, an oven, a hot roller, and the like can be used.

When heating is performed, the heating conditions are determined in view of the productivity, workability, thermal stability of the substrate, etc. The heating temperature is preferably in the range of 30 to 120° C., and more preferably 50 to 90° C. The heating time is preferably in the range of 1 to 60 minutes, and more preferably 1 to 20 minutes.

When heating is performed, the order in which active-energy-ray irradiation and heating are performed is not particularly limited; heating may be performed after active-energy-ray irradiation, active-energy-ray irradiation may be performed after heating, or active-energy-ray irradiation and heating may be performed at the same time.

When active-energy-ray irradiation and heating are performed at the same time, heat generated from an active-energy-ray irradiation source (for example, heat generated by a lamp) may be used as the heat source. Further, when active-energy-ray irradiation is performed after heating, the film-forming substrate may be irradiated with active energy rays while the substrate remains warm (i.e., while the substrate has remaining heat).

Since a coating film having excellent coating film appearance and repairability can be formed using the active energy ray-curable coating composition of the present invention, the active energy ray-curable coating composition is preferably used as a coating composition for forming the uppermost layer.

Method for Preparing Active Energy Ray-Curable Coating Composition

The present invention also relates to a method for preparing an active energy ray-curable coating composition.

The method for preparing an active energy ray-curable coating composition of the present invention comprises mixing, and dissolving or dispersing, the polymerizable unsaturated group(s)-containing acrylic resin (A), the urethane (meth)acrylate (B), the polymerizable unsaturated compound (C), and the photopolymerization initiator (D), which are described above, and optionally additives in a solvent.

In the preparation method of the present invention, the proportions of the polymerizable unsaturated group(s)-containing acrylic resin (A), the urethane (meth)acrylate (B), and the polymerizable unsaturated compound (C) are preferably in the following ranges based on the total solids content of the components (A), (B), and (C), from the viewpoint of coating film appearance, repairability, etc.:

polymerizable unsaturated group(s)-containing acrylic resin (A): 20 to 70 mass %, preferably 25 to 65 mass %, and more preferably 30 to 60 mass %, urethane (meth)acrylate (B): 10 to 60 mass %, preferably 20 to 55 mass %, and more preferably 30 to 50 mass %, polymerizable unsaturated compound (C): 1 to 30 mass %, preferably 4 to 26 mass %, and more preferably 8 to 22 mass %.

In the preparation method of the present invention, it is preferred that the amount of the photopolymerization initiator (D) is, on a solids basis, in the range of 0.1 to 20 parts by mass, preferably 0.5 to 15 parts by mass, and more preferably 1.0 to 10 parts by mass, per 100 parts by mass of the total solids content of the components (A), (B), and (C), from the viewpoint of repairability etc.

In the preparation method of the present invention, the components (A), (B), (C), and (D) are dissolved or dispersed so that the molecular weight between crosslinks of a cured coating film obtained by applying an active energy ray-curable coating composition to be prepared is in the range of 300 to 900 g/mol. Specifically, the molecular weight between crosslinks of the cured coating film can be adjusted to be in the range of 300 to 900 g/mol by, for example, [i] adjusting the unsaturated equivalent of the polymerizable unsaturated group(s)-containing acrylic resin (A), the urethane (meth)acrylate (B), and the polymerizable unsaturated compound (C) or [ii] adjusting the proportions of the components (A), (B), and (C).

The molecular weight between crosslinks of the cured coating film is preferably in the range of 320 to 750 g/mol, and more preferably 340 to 700 g/mol, from the viewpoint of repairability etc.

An active energy ray-curable coating composition that is capable of forming a coating film with excellent coating film appearance and repairability can be prepared by the preparation method of the present invention.

EXAMPLES

The present invention is described below in more detail with reference to Production Examples, Examples, and Comparative Examples. However, the present invention is not limited to these. In the examples, "parts" and "%" are expressed on a mass basis unless otherwise specified. The thickness of the coating film is based on the cured coating film.

Production of Polymerizable Unsaturated Group(s)-Containing Acrylic Resin (A)

Production Example 1

45 parts of methoxypropyl acetate was placed in a reaction vessel equipped with a thermometer, a thermostat, a stirrer, a reflux condenser, a nitrogen inlet tube, and a dropping funnel, and stirred at 125° C. while blowing in nitrogen gas. A monomer mixture comprising 4.3 parts of glycidyl methacrylate, 25.9 parts of methyl methacrylate, 69.8 parts of ethyl acrylate, and 12.0 parts of t-butyl peroxy-2-ethylhexanoate was added thereto dropwise at a constant rate over a period of 3 hours, and the resulting mixture was aged at the same temperature for another 0.5 hours. Thereafter, a mixture of 0.5 parts of t-butyl peroxy-2-ethylhexanoate and 10 parts of methoxypropyl acetate was further added to the reaction vessel dropwise over a period of 1 hour. After completion of the dropwise addition, the resulting mixture was aged for 2 hours, thereby obtaining an epoxy-containing acrylic resin solution. The obtained epoxy-containing acrylic resin had a glass transition temperature of 3° C. Subsequently, the epoxy-containing acrylic resin solution was heated to 130° C., and 2.0 parts of acrylic acid, 0.15 parts of hydroquinone monomethyl ether, and 0.5 parts of tetrabutylammonium bromide were further added to the epoxy-containing acrylic resin solution while blowing air into the reaction vessel. The resulting mixture was reacted at 130° C. for 16 hours and then diluted with methoxypropyl acetate, thereby obtaining a polymerizable unsaturated group(s)-containing acrylic resin (A-1) solution having a solids content of 50%. The obtained polymerizable unsaturated group(s)-containing acrylic resin (A-1) had a weight average molecular weight of 5,000, an unsaturated equivalent of 3,672 g/mol, and a hydroxy value of 14 mg KOH/g.

Production Examples 2 to 11 and 15 to 16

Solutions of polymerizable unsaturated group(s)-containing acrylic resins (A-2) to (A-11) and (A'-1) to (A'-2), which have a solids content of 50%, were obtained in the same manner as in Production Example 1, except that the formulation, reaction temperature, and reaction time of Production Example 1 were changed as shown in Table 1. Table 1 also shows the glass transition temperature of each functional group(s)-containing acrylic resin and the weight average molecular weight, unsaturated equivalent, and hydroxy value of each polymerizable unsaturated group(s)-containing acrylic resin.

Production Example 12

45 parts of butyl acetate was placed in a reaction vessel equipped with a thermometer, a thermostat, a stirrer, a reflux condenser, a nitrogen inlet tube, and a dropping funnel and stirred at 125° C. while blowing in nitrogen gas. A monomer mixture comprising 12.9 parts of 2-hydroxyethyl acrylate, 17.0 parts of methyl methacrylate, 70.1 parts of ethyl acrylate, and 6 parts of t-butyl peroxy-2-ethylhexanoate was added thereto dropwise at a constant rate over a period of 3 hours, and the resulting mixture was aged at the same temperature for another 0.5 hours. Thereafter, a mixture of 0.5 parts of t-butyl peroxy-2-ethylhexanoate and 10 parts of methoxypropyl acetate was further added to the reaction vessel dropwise over a period of 1 hour. After completion of the dropwise addition, the resulting mixture was aged for 2 hours, thereby obtaining a hydroxy-containing acrylic resin solution. The obtained hydroxy-containing acrylic resin had a glass transition temperature of 3° C. Subsequently, the hydroxy-containing acrylic resin solution was cooled to 80° C., and 17.2 parts of 2-isocyanatoethyl methacrylate, 0.4 parts of hydroquinone monomethyl ether, and 0.1 parts of dibutyltin dilaurate were added to the hydroxy-containing acrylic resin solution while blowing air into the reaction vessel. While the temperature was maintained at 80° C., the mixture was aged for 4 hours. After confirming that substantially all of the isocyanate groups had reacted, the mixture was diluted with butyl acetate, thereby obtaining a polymerizable unsaturated group(s)-containing acrylic resin (A-12) solution having a solids content of 50%. The obtained polymerizable unsaturated group(s)-containing acrylic resin (A-12) had a weight average molecular weight of 8,000, an unsaturated equivalent of 1,056 g/mol, and a hydroxy value of 0 mg KOH/g.

Production Example 13

45 parts of butyl acetate was placed in a reaction vessel equipped with a thermometer, a thermostat, a stirrer, a reflux condenser, a nitrogen inlet tube, and a dropping funnel and stirred at 125° C. while blowing in nitrogen gas. A monomer mixture comprising 12.9 parts of 2-hydroxyethyl acrylate, 17.0 parts of methyl methacrylate, 70.1 parts of ethyl acrylate, and 6 parts of t-butyl peroxy-2-ethylhexanoate was added thereto dropwise at a constant rate over a period of 3 hours, and the resulting mixture was aged at the same temperature for another 0.5 hours. Thereafter, a mixture of 0.5 parts of t-butyl peroxy-2-ethylhexanoate and 10 parts of methoxypropyl acetate was further added to the reaction vessel dropwise over a period of 1 hour. After completion of the dropwise addition, the resulting mixture was aged for 2 hours, thereby obtaining a hydroxy-containing acrylic resin solution. The obtained hydroxy-containing acrylic resin had a glass transition temperature of 3° C. Subsequently, the hydroxy-containing acrylic resin solution was cooled to 80° C., and 15.6 parts of 2-isocyanatoethyl acrylate, 0.4 parts of hydroquinone monomethyl ether, and 0.1 parts of dibutyltin dilaurate were added to the hydroxy-containing acrylic resin solution while blowing air into the reaction vessel. While the temperature was maintained at 80° C., the mixture was aged for 4 hours. After confirming that substantially all of the isocyanate groups had reacted, the mixture was diluted with butyl acetate, thereby obtaining a polymerizable unsaturated group(s)-containing acrylic resin (A-13) solution having a solids content of 50%. The obtained polymerizable unsaturated group(s)-containing acrylic resin (A-13) had a weight average molecular weight of 8,000, an unsaturated equivalent of 1,042 g/mol, and a hydroxy value of 0 mg KOH/g.

Production Example 14

45 parts of methoxypropyl acetate was placed in a reaction vessel equipped with a thermometer, a thermostat, a stirrer, a reflux condenser, a nitrogen inlet tube, and a dropping funnel and stirred at 125° C. while blowing in nitrogen gas. A monomer mixture comprising 8.0 parts of acrylic acid, 20.6 parts of methyl methacrylate, 71.4 parts of ethyl acrylate, and 6 parts of t-butyl peroxy-2-ethylhexanoate was added thereto dropwise at a constant rate over a period of 3 hours, and the resulting mixture was aged at the same temperature for another 0.5 hours. Thereafter, a mixture of 0.5 parts of t-butyl peroxy-2-ethylhexanoate and 10 parts of methoxypropyl acetate was further added to the reaction vessel dropwise over a period of 1 hour. After completion of the dropwise addition, the resulting mixture was aged for 2 hours, thereby obtaining a carboxy-containing acrylic resin solution. The obtained carboxy-containing acrylic resin had a glass transition temperature of 3° C. Subsequently, the carboxy-containing acrylic resin solution was heated to 130° C., and 17.4 parts of glycidyl methacrylate, 0.15 parts of hydroquinone monomethyl ether, and 0.5 parts of tetrabutylammonium bromide were further added to the carboxy-containing acrylic resin solution while blowing air into the reaction vessel. The resulting mixture was reacted at 130° C. for 10 hours and then diluted with methoxypropyl acetate, thereby obtaining a polymerizable unsaturated group(s)-containing acrylic resin (A-14) solution having a solids content of 50%. The obtained polymerizable unsaturated group(s)-containing acrylic resin (A-14) had a weight average molecular weight of 8,000, an unsaturated equivalent of 1,057 g/mol, and a hydroxy value of 56 mg KOH/g.

TABLE 1

| Production Example | | | | | 1 | 2 | 3 | 4 | 5 |
|---|---|---|---|---|---|---|---|---|---|
| | | Polymerizable unsaturated group(s)-containing acrylic resin (A) name | | | A-1 | A-2 | A-3 | A-4 | A-5 |
| Reaction for synthesizing functional group(s)-containing acrylic resin | Monomer mixture | Functional group-containing unsaturated monomer | Epoxy-containing polymerizable unsaturated monomer | Glycidyl methacrylate | 4.3 | 17.4 | 17.4 | 17.4 | 17.4 |
| | | Other polymerizable unsaturated monomers | | Methyl methacrylate | 25.9 | 17.5 | 17.5 | 17.5 | 17.5 |
| | | | | Ethyl acrylate | 69.8 | 65.1 | 65.1 | 65.1 | 65.1 |
| | | Polymerization initiator | | t-butyl peroxy-2-ethylhexanoate | 12 | 10 | 6 | 2 | 0.5 |
| | | Polymerization initiator | | t-butyl peroxy-2-ethylhexanoate | 0.5 | 0.5 | 0.5 | 0.5 | 0.5 |
| | | Solvent | | Methoxypropyl acetate | 10 | 10 | 10 | 10 | 10 |
| | | Reaction temperature (° C.) | | | 125 | 125 | 125 | 125 | 125 |
| | | Reaction time (Hr) | | | 6.5 | 6.5 | 6.5 | 6.5 | 6.5 |
| | | Glass transition temperature (° C.) | | | 3 | 3 | 3 | 3 | 3 |
| Addition reaction with functional group-containing polymerizable unsaturated compound | Carboxy-containing polymerizable unsaturated compound | | | Acrylic acid | 2 | 8 | 8 | 8 | 8 |
| | Polymerization inhibitor | | | Hydroquinone monomethyl ether | 0.15 | 0.15 | 0.15 | 0.15 | 0.15 |
| | Catalyst | | | Tetrabutylammonium bromide | 0.5 | 0.5 | 0.5 | 0.5 | 0.5 |
| | Reaction temperature (° C.) | | | | 130 | 130 | 130 | 130 | 130 |
| | Reaction time (Hr) | | | | 16 | 10 | 10 | 10 | 10 |
| | Weight average molecular weight | | | | 5,000 | 6,500 | 8,000 | 15,000 | 29,000 |
| | Unsaturated equivalent (g/mol) | | | | 3,672 | 972 | 972 | 972 | 972 |
| | Hydroxy value (mg KOH/g) | | | | 14 | 56 | 56 | 56 | 56 |

| Production Example | | | | | 6 | 7 | 8 | 9 | 10 |
|---|---|---|---|---|---|---|---|---|---|
| | | Polymerizable unsaturated group(s)-containing acrylic resin (A) name | | | A-6 | A-7 | A-8 | A-9 | A-10 |
| Reaction for synthesizing functional group(s)-containing acrylic resin | Monomer mixture | Functional group-containing unsaturated monomer | Epoxy-containing polymerizable unsaturated monomer | Glycidyl methacrylate | 10.9 | 32.6 | 43.4 | 17.4 | 17.4 |
| | | Other polymerizable unsaturated monomers | | Methyl methacrylate | | | | 14.6 | 56 |
| | | | | Styrene | 21.7 | | | | |
| | | | | Isobornyl acrylate | | 7.7 | | | |
| | | | | t-butyl methacrylate | | | 0.8 | | |
| | | | | Ethyl acrylate | 67.4 | 59.7 | 55.8 | 68 | |
| | | | | Isobutyl acrylate | | | | | 26.6 |
| | | Polymerization initiator | | t-butyl peroxy-2-ethylhexanoate | 6 | 6 | 6 | 6 | 6 |
| | | Polymerization initiator | | t-butyl peroxy-2-ethylhexanoate | 0.5 | 0.5 | 0.5 | 0.5 | 0.5 |
| | | Solvent | | Methoxypropyl acetate | 10 | 10 | 10 | 10 | 10 |
| | | Reaction temperature (° C.) | | | 125 | 125 | 125 | 125 | 125 |
| | | Reaction time (Hr) | | | 6.5 | 6.5 | 6.5 | 6.5 | 6.5 |
| | | Glass transition temperature (° C.) | | | 3 | 3 | 3 | 0 | 50 |

TABLE 1-continued

| | | | | | | | | |
|---|---|---|---|---|---|---|---|---|
| Addition reaction with functional group-containing polymerizable unsaturated compound | Carboxy-containing polymerizable unsaturated compound | | Acrylic acid | 5 | 15 | 20 | 8 | 8 |
| | Polymerization inhibitor | | Hydroquinone monomethyl ether | 0.15 | 0.15 | 0.15 | 0.15 | 0.15 |
| | Catalyst | | Tetrabutylammonium bromide | 0.5 | 0.5 | 0.5 | 0.5 | 0.5 |
| | Reaction temperature (° C.) | | | 130 | 130 | 130 | 130 | 130 |
| | Reaction time (Hr) | | | 13 | 7 | 5.5 | 10 | 10 |
| | Weight average molecular weight | | | 8,000 | 8,000 | 8,000 | 8,000 | 8,000 |
| | Unsaturated equivalent (g/mol) | | | 1,512 | 552 | 432 | 972 | 972 |
| | Hydroxy value (mg KOH/g) | | | 36 | 99 | 126 | 56 | 56 |

| | | | | Production Example | | | | | |
|---|---|---|---|---|---|---|---|---|---|
| | | | | | 11 | 12 | 13 | 14 | 15 | 16 |
| | Polymerizable unsaturated group(s)-containing acrylic resin (A) name | | | | A-11 | A-12 | A-13 | A-14 | A'-1 | A'-2 |
| Reaction for synthesizing functional group(s)-containing acrylic resin | Monomer mixture | Functional group-containing unsaturated monomer | Epoxy-containing polymerizable unsaturated monomer | Glycidyl methacrylate | 17.4 | | | | 17.4 | 17.4 |
| | | | Hydroxy-containing polymerizable unsaturated monomer | 2-hydroxyethyl acrylate | | 12.9 | 12.9 | | | |
| | | | Carboxy-containing polymerizable unsaturated monomer | Acrylic add | | | | 8 | | |
| | | Other polymerizable unsaturated monomers | | Methyl methacrylate | 80.8 | 17 | 17 | 20.6 | 17.5 | 17.5 |
| | | | | Ethyl acrylate | | 70.1 | 70.1 | 71.4 | 65.1 | 65.1 |
| | | | | 2-ethylhexyl methacrylate | 1.8 | | | | | |
| | | Polymerization initiator | | t-butyl peroxy-2-ethylhexanoate | 6 | 6 | 6 | 6 | 14 | 0.3 |
| | | Polymerization initiator | | t-butyl peroxy-2-ethylhexanoate | 0.5 | 0.5 | 0.5 | 0.5 | 0.5 | 0.5 |
| | | Solvent | | Methoxypropyl acetate | 10 | 10 | 10 | 10 | 10 | 10 |
| | Reaction temperature (° C.) | | | | 125 | 125 | 125 | 125 | 125 | 125 |
| | Reaction time (Hr) | | | | 6.5 | 6.5 | 6.5 | 6.5 | 6.5 | 6.5 |
| | Glass transition temperature (° C.) | | | | 90 | 3 | 3 | 3 | 3 | 3 |
| Addition reaction with functional group-containing polymerizable unsaturated compound | Carboxy-containing polymerizable unsaturated compound | | | Acrylic add | 8 | | | | 8 | 8 |
| | Isocyanate-containing polymerizable unsaturated compound | | | 2-isocyanatoethyl methacrylate | | 17.2 | | | | |
| | | | | 2-isocyanatoethyl acrylate | | | 15.6 | | | |
| | Epoxy-containing polymerizable unsaturated compound | | | Glycidyl methacrylate | | | | 17.4 | | |
| | Polymerization inhibitor | | | Hydroquinone monomethyl ether | 0.15 | 0.4 | 0.4 | 0.15 | 0.15 | 0.15 |
| | Catalyst | | | Tetrabutylammonium bromide | 0.5 | | | 0.5 | 0.5 | 0.5 |
| | | | | Dibutyltin dilaurate | | 0.1 | 0.1 | | | |
| | Reaction temperature (° C.) | | | | 130 | 80 | 80 | 130 | 130 | 130 |
| | Reaction time (Hr) | | | | 10 | 4 | 4 | 10 | 10 | 10 |
| | Weight average molecular weight | | | | 8,000 | 8,000 | 8,000 | 8,000 | 4,000 | 31,000 |
| | Unsaturated equivalent (g/mol) | | | | 972 | 1,056 | 1,042 | 1,057 | 972 | 972 |
| | Hydroxy value (mg KOH/g) | | | | 56 | 0 | 0 | 56 | 56 | 56 |

Production of Urethane (Meth)Acrylate (B)

Production Example 17

79 parts (0.3 mol) of methylenebis(4,1-cyclohexanediyl) diisocyanate (hydrogenated MDI; molecular weight: 262), 23.2 parts (0.2 mol) of 2-hydroxyethyl acrylate (molecular weight: 116), 12.4 parts (0.2 mol) of ethylene glycol (molecular weight: 62), 0.03 parts of dibutyltin dilaurate, and 0.1 parts of hydroquinone monomethyl ether were placed in a reaction vessel equipped with a thermometer, a thermostat, a stirrer, a reflux condenser, and an air blower, and the mixture was heated to 80° C. while blowing air into the reaction vessel and then maintained at the same temperature for 5 hours. After confirming that substantially all of the methylenebis(4,1-cyclohexanediyl)diisocyanate had reacted, the mixture was cooled, thereby obtaining a urethane (meth)acrylate (B-1) having a solids content of 100%. The obtained urethane (meth)acrylate had an average of two polymerizable unsaturated groups per molecule, a weight average molecular weight of 1,100, and a glass transition temperature of 38° C.

The urethanization reaction was confirmed by the method for measuring an isocyanate equivalent described in the section above regarding the urethane (meth)acrylate (B).

Production Examples 18 to 33

Urethane (meth)acrylates (B-2) to (B-14) and (B'-1) to (B'-3), which have a solids content of 100%, were obtained in the same manner as in Production Example 17, except that the formulation of Production Example 17 was changed as shown in Table 2. Table 2 also shows the average number of polymerizable unsaturated groups per molecule, weight average molecular weight, and glass transition temperature of each urethane (meth)acrylate.

TABLE 2

| Production Example | | 17 | 18 | 19 | 20 | 21 | 22 |
|---|---|---|---|---|---|---|---|
| Urethane (meth)acrylate (B) name | | B-1 | B-2 | B-3 | B-4 | B-5 | B6 |
| Polyisocyanate component (b1) | Methylenebis(4,1-cyclohexanediyl)diisocyanate | 79 | 105 | 210 | 236 | 288 | |
| | Isocyanurate ring adduct of hexamethylene diisocyanate | | | | | | 50 |
| Hydroxy-containing (meth)acrylate (b2) | 2-hydroxyethyl acrylate | 23.2 | 23.2 | 23.2 | 23.2 | 23.2 | 34.8 |
| Polyol component (b3) | Ethylene glycol | 12.4 | 18.6 | 43.4 | 49.6 | 62 | |
| Chain extension component for hydroxy-containing compound (b4) | ε-caprolactone | | | | | | 11.4 |
| Catalyst | Dibutyltin dilaurate | 0.03 | 0.03 | 0.03 | 0.03 | 0.03 | 0.03 |
| Polymerization inhibitor | Hydroquinone monomethyl ether | 0.1 | 0.1 | 0.1 | 0.1 | 0.1 | 0.1 |
| Average number of polymerizable unsaturated groups per molecule | | 2 | 2 | 2 | 2 | 2 | 3 |
| Weight average molecular weight | | 1,100 | 1,500 | 3,000 | 4,000 | 4,900 | 1,000 |
| Glass transition temperature (° C.) | | 38 | 38 | 38 | 38 | 38 | 17 |

| Production Example | | 23 | 24 | 25 | 26 | 27 | 28 |
|---|---|---|---|---|---|---|---|
| Urethane (meth)acrylate (B) name | | B-7 | B-8 | B-9 | B-10 | B-11 | B-12 |
| Polyisocyanate component (b1) | Isocyanurate ring adduct of hexamethylene diisocyanate | 100 | 192 | 202 | 212 | 302 | 353 |
| Hydroxy-containing (meth)acrylate (b2) | 2-hydroxyethyl acrylate | 34.8 | 27.8 | 34.8 | 41.8 | 34.8 | 34.8 |
| Polyol component (b3) | 1,3-butanediol | 13.5 | 22.5 | 22.5 | 22.5 | 36 | 45 |
| | Diethylene glycol | | 21.2 | 21.2 | 21.2 | 37.1 | 42.4 |
| Chain extension component for hydroxy-containing compound (b4) | ε-caprolactone | 11.4 | 11.4 | 11.4 | 11.4 | 11.4 | 11.4 |
| Catalyst | Dibutyltin dilaurate | 0.03 | 0.03 | 0.03 | 0.03 | 0.03 | 0.03 |
| Polymerization inhibitor | Hydroquinone monomethyl ether | 0.1 | 0.1 | 0.1 | 0.1 | 0.1 | 0.1 |
| Average number of polymerizable unsaturated groups per molecule | | 3 | 2.4 | 3 | 3.6 | 3 | 3 |
| Weight average molecular weight | | 1,500 | 3,000 | 3,000 | 3,000 | 4,000 | 4,900 |
| Glass transition temperature (° C.) | | 17 | 17 | 17 | 17 | 17 | 17 |

| Production Example | | 29 | 30 | 31 | 32 | 33 |
|---|---|---|---|---|---|---|
| Urethane (meth)acrylate (B) name | | B-13 | B-14 | B'-1 | B'-2 | B'-3 |
| Polyisocyanate component (b1) | Methylenebis(4,1-cyclohexanediyl)diisocyanate | 26 | | 52 | 341 | |
| | Isocyanurate ring adduct of hexamethylene diisocyanate | | 50 | | | 151 |
| | Hexamethylene diisocyanate | | 50.4 | | | |
| Hydroxy-containing (meth)acrylate (b2) | 2-hydroxyethyl acrylate | 23.2 | | 23.2 | 23.2 | 58 |
| | Placcel FA-2D (*1) | | 69 | | | |
| Polyol component (b3) | Ethylene glycol | 18.6 | | 6.2 | 74.4 | 12.4 |
| Chain extension component for hydroxy-containing compound (b4) | ε-caprolactone | | | | | 11.4 |
| Catalyst | Dibutyltin dilaurate | 0.03 | 0.03 | 0.03 | 0.03 | 0.03 |
| Polymerization inhibitor | Hydroquinone monomethyl ether | 0.1 | 0.1 | 0.1 | 0.1 | 0.1 |
| Average number of polymerizable unsaturated groups per molecule | | 2 | 2 | 2 | 2 | 5 |
| Weight average molecular weight | | 1,500 | 1,000 | 800 | 5,100 | 2,300 |
| Glass transition temperature (° C.) | | −10 | 20 | 38 | 38 | 38 |

(*1): Placcel FA-2D: trade name, produced by Daicel Chemical Industries, Ltd., a monomer obtained by addition of 2 moles of ε-caprolactone to 1 mole of 2-hydroxyethyl acrylate Production of Active Energy Ray-Curable Coating Composition Example 1

112 parts (solids content: 56 parts) of the polymerizable unsaturated group(s)-containing acrylic resin (A-1) obtained in Production Example 1, which has a solids content of 50%, 33 parts (solids content: 33 parts) of the urethane (meth) acrylate (B-9) obtained in Production Example 25, 11 parts (solids content: 11 parts) of a polymerizable unsaturated compound (C-1) (Note 2), 6 parts of Irgacure 184 (trade name, produced by BASF SE, a photopolymerization initiator, solids content: 100%), 1 part of Irgacure TPO (trade name, produced by BASF SE, a photopolymerization initiator, solids content: 100%), 2 parts of Tinuvin 400 (trade name, produced by BASF SE, a triazine ultraviolet absorber, solids content: 100%), 2 parts of Tinuvin 292 (trade name, produced by BASF SE, a hindered amine light stabilizer, solids content: 100%), and 0.1 parts of BYK-333 (trade name, produced by BYK-Chemie, a silicon surface control agent, solids content: 100%) were uniformly mixed and further stirred while diluting the mixture with methoxypropyl acetate so that the solids content was 50%, thereby obtaining an active energy ray-curable coating composition No. 1.

Examples 2 to 47 and Comparative Examples 1 to 11

Active energy ray-curable coating compositions Nos. 2 to 58, which have a solids content of 50%, were obtained in the same manner as in Example 1, except that the formulation of Example 1 was changed as shown in Table 3. The amounts of the components shown in Table 3 are expressed as solids content by mass.

TABLE 3

| | | Example | | | | | | | |
|---|---|---|---|---|---|---|---|---|---|
| | | 1 | 2 | 3 | 4 | 5 | 6 | 7 | 8 |
| Active energy ray-curable coating composition No. | | 1 | 2 | 3 | 4 | 5 | 6 | 7 | 8 |
| Polymerizable unsaturated group(s)-containing acrylic resin (A) | A-1 | 56 | | | | | | | |
| | A-2 | | 56 | | | | | | |
| | A-3 | | | 56 | | | | | |
| | A-4 | | | | 56 | | | | |
| | A-5 | | | | | 56 | | | |
| | A-6 | | | | | | 56 | | |
| | A-7 | | | | | | | 56 | |
| | A-8 | | | | | | | | 56 |
| Urethane (meth)acrylate (B) | B-9 | 33 | 33 | 33 | 33 | 33 | 33 | 33 | 33 |
| Polymerizable unsaturated compound (C) | Polymerizable unsaturated compound (C-1) (*2) | 11 | 11 | 11 | 11 | 11 | 11 | 11 | 11 |
| Photopolymerization initiator (D) | Irgacure 184 | 6 | 6 | 6 | 6 | 6 | 6 | 6 | 6 |
| | Irgacure TPO | 1 | 1 | 1 | 1 | 1 | 1 | 1 | 1 |
| Ultraviolet absorber | Tinuvin 400 | 2 | 2 | 2 | 2 | 2 | 2 | 2 | 2 |
| Light stabilizer | Tinuvin 292 | 2 | 2 | 2 | 2 | 2 | 2 | 2 | 2 |
| Surface control agent | BYK-333 | 0.1 | 0.1 | 0.1 | 0.1 | 0.1 | 0.1 | 0.1 | 0.1 |

| | | Example | | | | | | | | |
|---|---|---|---|---|---|---|---|---|---|---|
| | | 9 | 10 | 11 | 12 | 13 | 14 | 15 | 16 | 17 |
| Active energy ray-curable coating composition No. | | 9 | 10 | 11 | 12 | 13 | 14 | 15 | 16 | 17 |
| Polymerizable unsaturated group(s)-containing acrylic resin (A) | A-3 | | | | | | | 56 | 56 | 56 |
| | A-9 | 56 | | | | | | | | |
| | A-10 | | 56 | | | | | | | |
| | A-11 | | | 56 | | | | | | |
| | A-12 | | | | 56 | | | | | |
| | A-13 | | | | | 56 | | | | |
| | A-14 | | | | | | 56 | | | |
| Urethane (meth)acrylate (B) | B-1 | | | | | | | 33 | | |
| | B-2 | | | | | | | | 33 | |
| | B-3 | | | | | | | | | 33 |
| | B-9 | 33 | 33 | 33 | 33 | 33 | 33 | | | |
| Polymerizable unsaturated compound (C) | Polymerizable unsaturated compound (C-1) (*2) | 11 | 11 | 11 | 11 | 11 | 11 | 11 | 11 | 11 |
| Photopolymerization initiator (D) | Irgacure 184 | 6 | 6 | 6 | 6 | 6 | 6 | 6 | 6 | 6 |
| | Irgacure TPO | 1 | 1 | 1 | 1 | 1 | 1 | 1 | 1 | 1 |
| Ultraviolet absorber | Tinuvin 400 | 2 | 2 | 2 | 2 | 2 | 2 | 2 | 2 | 2 |
| Light stabilizer | Tinuvin 292 | 2 | 2 | 2 | 2 | 2 | 2 | 2 | 2 | 2 |
| Surface control agent | BYK-333 | 0.1 | 0.1 | 0.1 | 0.1 | 0.1 | 0.1 | 0.1 | 0.1 | 0.1 |

TABLE 3-continued

|  |  | Example |  |  |  |  |  |  |  |
|---|---|---|---|---|---|---|---|---|---|
|  |  | 18 | 19 | 20 | 21 | 22 | 23 | 24 | 25 |
|  | Active energy ray-curable coating composition No. | 18 | 19 | 20 | 21 | 22 | 23 | 24 | 25 |
| Polymerizable unsaturated group(s)-containing acrylic resin (A) | A-3 | 56 | 56 | 56 | 56 | 56 | 56 | 56 | 56 |
| Urethane (meth)acrylate (B) | B-4 | 33 |  |  |  |  |  |  |  |
|  | B-5 |  | 33 |  |  |  |  |  |  |
|  | B-6 |  |  | 33 |  |  |  |  |  |
|  | B-7 |  |  |  | 33 |  |  |  |  |
|  | B-8 |  |  |  |  | 33 |  |  |  |
|  | B-9 |  |  |  |  |  |  |  |  |
|  | B-10 |  |  |  |  |  | 33 |  |  |
|  | B-11 |  |  |  |  |  |  | 33 |  |
|  | B-12 |  |  |  |  |  |  |  | 33 |
| Polymerizable unsaturated compound (C) | Polymerizable unsaturated compound (C-1) (*2) | 11 | 11 | 11 | 11 | 11 | 11 | 11 | 11 |
| Photopolymerization initiator (D) | Irgacure 184 | 6 | 6 | 6 | 6 | 6 | 6 | 6 | 6 |
|  | Irgacure TPO | 1 | 1 | 1 | 1 | 1 | 1 | 1 | 1 |
| Ultraviolet absorber | Tinuvin 400 | 2 | 2 | 2 | 2 | 2 | 2 | 2 | 2 |
| Light stabilizer | Tinuvin 292 | 2 | 2 | 2 | 2 | 2 | 2 | 2 | 2 |
| Surface control agent | BYK-333 | 0.1 | 0.1 | 0.1 | 0.1 | 0.1 | 0.1 | 0.1 | 0.1 |

|  |  | Example |  |  |  |  |  |  |  |
|---|---|---|---|---|---|---|---|---|---|
|  |  | 26 | 27 | 28 | 29 | 30 | 31 | 32 | 33 |
|  | Active energy ray-curable coating composition No. | 26 | 27 | 28 | 29 | 30 | 31 | 32 | 33 |
| Polymerizable unsaturated group(s)-containing acrylic resin (A) | A-3 | 56 | 56 | 56 | 56 | 56 | 56 |  |  |
|  | A-9 |  |  |  |  |  |  | 50 | 50 |
| Urethane (meth)acrylate (B) | B-9 |  |  |  | 33 | 33 | 33 | 33 | 30 | 30 |
|  | B-13 | 33 |  |  |  |  |  |  |  |
|  | B-14 |  | 33 |  |  |  |  |  |  |
| Polymerizable unsaturated compound (C) | Polymerizable unsaturated compound (C-1) (*2) | 11 | 11 |  |  |  |  |  |  |
|  | Polymerizable unsaturated compound (C-2) (*3) |  |  | 11 |  |  |  | 10 | 10 |
|  | Polymerizable unsaturated compound (C-3) (*4) |  |  |  | 11 |  |  |  |  |
|  | Polymerizable unsaturated compound (C-4) (*5) |  |  |  |  | 11 |  |  |  |
|  | Polymerizable unsaturated compound (C-5) (*6) |  |  |  |  |  | 11 |  |  |
| Photopolymerization initiator (D) | Irgacure 184 | 6 | 6 | 6 | 6 | 6 | 6 | 6 | 6 |
|  | Irgacure TPO | 1 | 1 | 1 | 1 | 1 | 1 | 1 | 1 |
| Ultraviolet absorber | Tinuvin 400 | 2 | 2 | 2 | 2 | 2 | 2 | 2 | 2 |
| Light stabilizer | Tinuvin 292 | 2 | 2 | 2 | 2 | 2 | 2 | 2 | 2 |
| Polymerizable unsaturated components (A), (B), and (C) | 3-(methacryloyloxy)propyltrimethoxysilane |  |  |  |  |  |  | 10 |  |
|  | N-hydroxyethyl acrylamide |  |  |  |  |  |  |  | 10 |
| Surface control agent | BYK-333 | 0.1 | 0.1 | 0.1 | 0.1 | 0.1 | 0.1 | 0.1 | 0.1 |

|  |  | Example |  |  |  |  |  |  |
|---|---|---|---|---|---|---|---|---|
|  |  | 34 | 35 | 36 | 37 | 38 | 39 | 40 | 41 |
|  | Active energy ray-curable coating composition No. | 34 | 35 | 36 | 37 | 38 | 39 | 40 | 41 |
| Polymerizable unsaturated group(s)-containing acrylic resin (A) | A-9 | 50 |  |  |  | 62 |  |  | 56 |
|  | A-10 |  | 56 | 56 | 56 |  | 51 |  |  |
|  | A-11 |  |  |  |  |  |  | 34 |  |
| Urethane (meth)acrylate (B) | B-1 |  |  |  |  | 28 |  |  |  |
|  | B-6 |  |  |  |  |  | 39 |  |  |
|  | B-9 | 30 | 33 | 33 | 33 |  |  |  |  |
|  | B-13 |  |  |  |  |  |  | 56 | 34 |

TABLE 3-continued

| | | | | | | | | | |
|---|---|---|---|---|---|---|---|---|---|
| Polymerizable unsaturated compound (C) | Polymerizable unsaturated compound (C-1) (*2) | | | 11 | 11 | 11 | 10 | 10 | 10 | 10 |
| | Polymerizable unsaturated compound (C-2) (*3) | 10 | | | | | | | | |
| Photopolymerization initiator (D) | Irgacure 184 | 6 | 6 | 6 | 6 | 6 | 6 | 6 | 6 |
| | Irgacure TPO | 1 | 1 | 1 | 1 | 1 | 1 | 1 | 1 |
| Ultraviolet absorber | Tinuvin 400 | 2 | | 2 | 2 | 2 | 2 | 2 | 2 |
| Light stabilizer | Tinuvin 292 | 2 | | | 2 | 2 | 2 | 2 | 2 |
| Polymerizable unsaturated compound other than components (A), (B), and (C) | 4-acryloylmorpholine | 10 | | | | | | | |
| Surface control agent | BYK-333 | 0.1 | | | 0.1 | 0.1 | 0.1 | 0.1 | 0.1 |

| | | Example | | | | | | Comparative Example | |
|---|---|---|---|---|---|---|---|---|---|
| | | 42 | 43 | 44 | 45 | 46 | 47 | 1 | 2 |
| Active energy ray-curable coating composition No. | | 42 | 43 | 44 | 45 | 46 | 47 | 48 | 49 |
| Polymerizable unsaturated group(s)-containing acrylic resin (A) | A-3 | | 77 | 67 | 51 | 36 | 26 | | 66 |
| | A-11 | 53 | | | | | | | |
| Urethane (meth)acrylate (B) | B-1 | 32 | | | | | | | |
| | B-3 | | | | | | | 63 | |
| | B-7 | | 13 | 23 | 39 | 54 | 64 | | |
| Polymerizable unsaturated compound (C) | Polymerizable unsaturated compound (C-1) (*2) | 15 | 10 | 10 | 10 | 10 | 10 | 37 | 34 |
| Photopolymerization initiator (D) | Irgacure 184 | 6 | 6 | 6 | 6 | 6 | 6 | 6 | 6 |
| | Irgacure TPO | 1 | 1 | 1 | 1 | 1 | 1 | 1 | 1 |
| Ultraviolet absorber | Tinuvin 400 | 2 | 2 | 2 | 2 | 2 | 2 | 2 | 2 |
| Light stabilizer | Tinuvin 292 | 2 | 2 | 2 | 2 | 2 | 2 | 2 | 2 |
| Surface control agent | BYK-333 | 0.1 | 0.1 | 0.1 | 0.1 | 0.1 | 0.1 | 0.1 | 0.1 |

| | | Comparative Example | | | | | | | | |
|---|---|---|---|---|---|---|---|---|---|---|
| | | 3 | 4 | 5 | 6 | 7 | 8 | 9 | 10 | 11 |
| Active energy ray-curable coating composition No. | | 50 | 51 | 52 | 53 | 54 | 55 | 56 | 57 | 58 |
| Polymerizable unsaturated group(s)-containing acrylic resin (A) | A-3 | | | | 62 | 56 | 56 | 56 | | |
| | A-5 | | | | | | | | | 56 |
| | A-7 | 66 | | | | | | | | |
| | A-8 | | | | | | | | 56 | |
| | A'-1 | | 56 | | | | | | | |
| | A'-2 | | | 56 | | | | | | |
| Urethane (meth)acrylate (B) | B-3 | | | | | | | 33 | | |
| | B-5 | | | | | | | | | 33 |
| | B-6 | | | | | | | | 33 | |
| | B-7 | 34 | | | | | | | | |
| | B-8 | | | | | | | | | |
| | B-9 | | 33 | 33 | | | | | | |
| | B'-1 | | | | 28 | | | | | |
| | B'-2 | | | | | 33 | | | | |
| | B'-3 | | | | | | 33 | | | |
| Polymerizable unsaturated compound (C) | Polymerizable unsaturated compound (C-1) (*2) | | 11 | 11 | 10 | 11 | 11 | | 11 | 11 |
| | Polymerizable unsaturated compound (C'-1) (*7) | | | | | | | 11 | | |
| Photopolymerization initiator (D) | Irgacure 184 | 6 | 6 | 6 | 6 | 6 | 6 | 6 | 6 | 6 |
| | Irgacure TPO | 1 | 1 | 1 | 1 | 1 | 1 | 1 | 1 | 1 |
| Ultraviolet absorber | Tinuvin 400 | 2 | 2 | 2 | 2 | 2 | 2 | 2 | 2 | 2 |
| Light stabilizer | Tinuvin 292 | 2 | 2 | 2 | 2 | 2 | 2 | 2 | 2 | 2 |
| Surface control agent | BYK-333 | 0.1 | 0.1 | 0.1 | 0.1 | 0.1 | 0.1 | 0.1 | 0.1 | 0.1 |

The notes (marked with asterisks) in Table 3 mean the following.

(*2): Polymerizable unsaturated compound (C-1): Aronix M-215 (trade name, produced by Toagosei Co., Ltd., isocyanuric acid ethylene oxide-modified diacrylate, weight average molecular weight: 270, number of polymerizable unsaturated groups: 2)

(*3): Polymerizable unsaturated compound (C-2): Irr214K (trade name, produced by Daicel-Allnex Ltd., tricyclodecane dimethanol diacrylate, weight average molecular weight: 300, number of polymerizable unsaturated groups: 2)

(*4): Polymerizable unsaturated compound (C-3): Tmpta (trade name, produced by Daicel-Allnex Ltd., trimethylolpropane triacrylate, weight average molecular weight: 286, number of polymerizable unsaturated groups: 3)

(*5): Polymerizable unsaturated compound (C-4): Aronix M-315 (trade name, produced by Toagosei Co., Ltd., isocyanuric acid ethylene oxide-modified di- and tri-acrylate, weight average molecular weight: 387, number of polymerizable unsaturated groups: 3)

(*6): Polymerizable unsaturated compound (C-5): Dpha (trade name, produced by Daicel-Allnex Ltd., dipentaerythritol hexaacrylate, weight average molecular weight: 524, number of polymerizable unsaturated groups: 6)

(*7): Polymerizable unsaturated compound (C'-1): SR740 (trade name, produced by Sartomer Co., Ltd., polyethylene glycol (1000) dimethacrylate, weight average molecular weight: 1,136, number of polymerizable unsaturated groups: 2)

Preparation of Test Plate
Substrate
ABS Substrate

The surface of an acrylonitrile-butadiene-styrene plate having a size of 100 mm×150 mm×3.0 mm was degreased with isopropyl alcohol to obtain an ABS substrate.
AES Substrate The surface of an acrylonitrile-ethylene-styrene plate having a size of 100 mm×150 mm×3.0 mm was degreased with isopropyl alcohol to obtain an AES substrate.
ASA Substrate The surface of an acrylonitrile-styrene-acrylate plate having a size of 100 mm×150 mm×3.0 mm was degreased with isopropyl alcohol to obtain an ASA substrate.

Example 48

The active energy ray-curable coating composition No. 1 obtained in Example 1 was applied to the ABS substrate to a film thickness of 30 μm using an air spray. Subsequently, the substrate was subjected to setting at room temperature for 2 minutes and then preheated at 80° C. for 3 minutes. Thereafter, UV irradiation of 400 mW/cm$^2$, 1,500 mJ/cm$^2$, was performed using a metal halide lamp, thereby preparing a test plate.

Examples 49 to 97 and Comparative Examples 12 to 22

Test plates were obtained in the same manner as in Example 48, except that the substrates and active energy ray-curable coating compositions shown in Table 4 were used and that the film thickness of the active energy ray-curable coating compositions was changed as shown in Table 4.
Evaluation of Test Plate The obtained test plates were tested as follows. Table 4 shows the evaluation results.
Test Method
Coating Film Appearance (Smoothness)

Each test plate was evaluated for coating film appearance according to the following criteria:

S: Smooth with no orange peel observed;
A: Very slight orange peel was observed;
B: Slight orange peel was observed;
C: Significant orange peel was observed.

Coating Film Appearance (Gloss)

The gloss of each coated surface was measured based on the specular gloss (60 degrees) according to JIS K5600-4-7 (1999). The measured gloss was evaluated according to the following criteria:

A: Specular gloss (60 degrees) of 85 or more;
B: Specular gloss (60 degrees) of 75 or more but less than 85;
C: Specular gloss (60 degrees) of 70 or more but less than 75;
D: Specular gloss (60 degrees) of 60 or more but less than 70;
E: specular gloss (60 degrees) of less than 60.

Repairability

For repair, dust, dirt, etc. adhering to the coating film surface on each test plate was removed by sanding the coating film, and subsequently the traces left by sanding were erased by polishing with polishing powder. Repairability was evaluated according to the following criteria:

S: Removing dust etc. from the coating film and polishing the coating film were easy, and no difference in the coating film appearance was observed between the repaired portion and the unrepaired portion.
A: Removing dust etc. from the coating film and polishing the coating film were somewhat difficult, but almost no difference in the coating film appearance was observed between the repaired portion and the unrepaired portion.
B: Removing dust etc. from the coating film and polishing the coating film were difficult, and a slight difference in the coating film appearance was observed between the repaired portion and the unrepaired portion.
C: Removing dust etc. from the coating film and polishing the coating film were difficult, and a significant difference in the coating film appearance was observed between the repaired portion and the unrepaired portion.

Scratch Resistance

Each test plate was attached to an automobile roof by using water-resistant adhesive tape (produced by Nichiban Co., Ltd.), and the automobile, which had the test plate on its roof, was washed 15 times in a car wash at 20° C. Thereafter, the 20° specular reflection (20° gloss) of the test plate was measured, and the gloss retention (%) relative to the 20° gloss value before the test was calculated to evaluate the scratch resistance. The higher the gloss retention, the better the scratch resistance. The car wash used was a 5020 FWRC (produced by Yasui Sangyo K. K.).

A: Gloss retention of 80% or more
B: Gloss retention of 75% or more but less than 80%
C: Gloss retention of 70% or more but less than 75%
D: Gloss retention of 50% or more but less than 70%
E: Gloss retention of less than 50%

TABLE 4

| | | Substrate | Active energy ray-curable coating composition Composition name | Film thickness (μm) | Properties of cured coating film Molecular weight between crosslinks (g/mol) | Glass transition temperature (° C.) | Evaluation results Coating film appearance Smoothness | Gloss | Repairability | Scratch resistance |
|---|---|---|---|---|---|---|---|---|---|---|
| Example | 48 | ABS | 1 | 30 | 770 | 50 | S | A | A | A |
| | 49 | substrate | 2 | 30 | 510 | 60 | S | A | S | A |
| | 50 | | 3 | 30 | 570 | 58 | S | A | S | A |
| | 51 | | 4 | 30 | 720 | 55 | A | B | S | A |
| | 52 | | 5 | 30 | 880 | 45 | A | C | A | A |
| | 53 | | 6 | 30 | 710 | 50 | S | A | S | A |
| | 54 | | 7 | 30 | 450 | 56 | S | A | S | A |
| | 55 | | 8 | 30 | 310 | 64 | S | A | A | B |

TABLE 4-continued

| | | | | | | | | | |
|---|---|---|---|---|---|---|---|---|---|
| 56 | 9 | 30 | 570 | 45 | S | A | S | A | |
| 57 | 10 | 30 | 570 | 90 | S | A | S | B | |
| 58 | 11 | 30 | 570 | 120 | S | A | A | C | |
| 59 | 12 | 30 | 580 | 50 | S | A | A | A | |
| 60 | 13 | 30 | 550 | 50 | S | A | A | A | |
| 61 | 14 | 30 | 570 | 55 | S | A | A | A | |
| 62 | 15 | 30 | 420 | 70 | S | A | A | C | |
| 63 | 16 | 30 | 480 | 62 | S | A | A | B | |
| 64 | 17 | 30 | 590 | 53 | S | A | A | A | |
| 65 | 18 | 30 | 680 | 53 | S | A | A | A | |
| 66 | 19 | 30 | 770 | 45 | S | A | A | A | |
| 67 | 20 | 30 | 330 | 61 | S | A | A | A | |
| 68 | 21 | 30 | 390 | 58 | S | A | S | A | |
| 69 | 22 | 30 | 600 | 58 | S | A | A | A | |
| 70 | 23 | 30 | 530 | 58 | S | A | A | A | |
| 71 | 24 | 30 | 630 | 51 | S | A | S | A | |
| 72 | 25 | 30 | 690 | 46 | S | A | S | A | |
| 73 | 26 | 30 | 670 | 43 | S | A | S | A | |
| 74 | 27 | 30 | 490 | 59 | S | A | S | A | |
| 75 | 28 | 30 | 570 | 65 | S | A | S | A | |
| 76 | 29 | 30 | 550 | 58 | S | A | S | A | |
| 77 | 30 | 30 | 570 | 55 | S | A | S | A | |
| 78 | 31 | 30 | 540 | 60 | S | A | S | A | |

| | | Active energy ray-curable coating composition | | Properties of cured coating film | | Evaluation results | | | |
|---|---|---|---|---|---|---|---|---|---|
| | Substrate | Composition name | Film thickness (μm) | Molecular weight between crosslinks (g/mol) | Glass transition temperature (° C.) | Coating film appearance | | | Scratch resistance |
| | | | | | | Smoothness | Gloss | Repairability | |
| Example 79 | ABS substrate | 32 | 30 | 570 | 65 | S | A | S | A |
| 80 | | 33 | 30 | 580 | 68 | S | A | S | A |
| 81 | | 34 | 30 | 580 | 68 | S | A | S | A |
| 82 | | 35 | 30 | 580 | 90 | S | A | S | B |
| 83 | | 36 | 30 | 580 | 90 | S | A | S | B |
| 84 | | 37 | 30 | 580 | 90 | S | A | S | B |
| 85 | | 38 | 30 | 500 | 50 | S | A | S | A |
| 86 | | 39 | 30 | 490 | 52 | S | A | S | A |
| 87 | | 40 | 30 | 570 | 50 | S | A | S | A |
| 88 | | 41 | 30 | 540 | 25 | S | A | S | A |
| 89 | | 42 | 30 | 630 | 128 | S | A | S | B |
| 90 | | 43 | 30 | 800 | 63 | S | A | A | C |
| 91 | | 44 | 30 | 760 | 61 | S | A | S | B |
| 92 | | 45 | 30 | 580 | 56 | S | A | S | B |
| 93 | | 46 | 30 | 460 | 54 | S | A | S | A |
| 94 | | 47 | 30 | 410 | 52 | S | A | A | A |
| 95 | | 39 | 35 | 490 | 52 | S | A | S | A |
| 96 | AES substrate | 34 | 30 | 580 | 68 | S | A | S | A |
| 97 | ASA substrate | 34 | 30 | 580 | 68 | S | A | S | A |
| Comparative Example 12 | ABS substrate | 48 | 30 | 780 | 66 | S | A | C | B |
| 13 | | 49 | 30 | 720 | 52 | S | A | C | E |
| 14 | | 50 | 30 | 750 | 61 | S | A | C | D |
| 15 | | 51 | 30 | 460 | 57 | S | A | C | C |
| 16 | | 52 | 30 | 850 | 61 | C | E | C | A |
| 17 | | 53 | 30 | 840 | 62 | S | A | C | E |
| 18 | | 54 | 30 | 730 | 59 | B | D | C | A |
| 19 | | 55 | 30 | 500 | 60 | S | A | C | E |
| 20 | | 56 | 30 | 690 | 48 | S | A | C | D |
| 21 | | 57 | 30 | 290 | 66 | S | A | C | E |
| 22 | | 58 | 30 | 920 | 55 | S | A | C | B |

The invention claimed is:

1. A method for forming a coating film, comprising:
applying an active energy ray-curable coating composition as an uppermost layer to a substrate to form an uncured coating film; and
irradiating the uncured coating film with active energy rays to cure the coating film,
wherein the active energy ray-curable coating composition comprises:

(A) a polymerizable unsaturated group(s)-containing acrylic resin having a weight average molecular weight in the range of 5,000 to 30,000:
(B) a urethane (meth)acrylate having a weight average molecular weight in the range of 1.000 or more but less than 5,000 and containing an average of two to four polymerizable unsaturated groups per molecule;
(C) a polymerizable unsaturated compound having a weight average molecular weight in the range of 200 or more but less than 1,000 and containing an average of two to nine polymerizable unsaturated groups per molecule; and (D) a photopolymerization initiator, wherein the molecular weight between crosslinks of a cured coating film obtained by applying the active energy ray-curable coating composition is in the range of 300 to 900 g/mol, and wherein a gloss of a surface coated with the coating film measured based on the specular gloss (60 degrees) according to JIS K5600-4-7 (1999) is 70 or more, on the condition that the surface coated with the coating film is prepared by applying the active energy ray-curable coating composition to an acrylonitrile-butadiene-styrene substrate, acrylonitrile-ethylene-styrene substrate or acrylonitrile-styrene-acrylate substrate to a film thickness of 30 μm using an air spray, setting the substrate at room temperature for 2 minutes and then preheating at 80° C. for 3 minutes, and performing UV irradiation using a metal halide lamp.

2. A method for forming a coating film, comprising:

applying an active energy ray-curable coating composition as an uppermost layer to a substrate to form an uncured coating film; and irradiating the uncured coating film with active energy rays to cure the coating film, wherein the active energy ray-curable coating composition comprises:

(A) a polymerizable unsaturated group(s)-containing acrylic resin having a weight average molecular weight in the range of 5,000 to 30,000;

(B) a urethane (meth)acrylate having a weight average molecular weight in the range of 1,000 or more but less than 5,000 and containing an average of two to four polymerizable unsaturated groups per molecule;

(C) a polymerizable unsaturated compound having a weight average molecular weight in the range of 200 or more but less than 1,000 and containing an average of two to nine polymerizable unsaturated groups per molecule; and (D) a photopolymerization initiator, wherein the molecular weight between crosslinks of a cured coating film obtained by applying the active energy ray-curable coating composition is in the range of 300 to 900 g/mol, and wherein a gloss retention (%) of the coating film after being washed 15 times in a car wash at 20° C. is 70% or more, on the condition that the coating film is prepared by applying the active energy ray-curable coating composition to an acrylonitrile-butadiene-styrene substrate, acrylonitrile-ethylene-styrene substrate or acrylonitrile-styrene-acrylate substrate to a film thickness of 30 μm using an air spray, setting the substrate at room temperature for 2 minutes and then preheating at 80° C. for 3 minutes, and performing UV irradiation using a metal halide lamp, and that the coating film is attached to an automobile roof.

3. The method according to claim 1, wherein, in the active energy ray-curable coating composition, an amount of the component (A) on a solids basis is in a range of 20 to 70 mass %, an amount of the component (B) on a solids basis is in a range of 10 to 60 mass %, and an amount of the component (C) on a solids basis is in a range of 1 to 30 mass %, based on a total solids content of the components (A), (B), and (C).

4. The method according to claim 2, wherein, in the active energy ray-curable coating composition, an amount of the component (A) on a solids basis is in a range of 20 to 70 mass %, an amount of the component (B) on a solids basis is in a range of 10 to 60 mass %, and an amount of the component (C) on a solids basis is in a range of 1 to 30 mass %, based on a total solids content of the components (A), (B), and (C).

5. The method according to claim 1, wherein the active energy ray-curable coating composition further comprises an ultraviolet absorber and/or a light stabilizer.

6. The method according to claim 2, wherein the active energy ray-curable coating composition further comprises an ultraviolet absorber and/or a light stabilizer.

7. The method according to claim 1, wherein the cured coating film has a glass transition temperature in a range of 20 to 80° C.

8. The method according to claim 2, wherein the cured coating film has a glass transition temperature in a range of 20 to 80° C.

* * * * *